US012695809B2

(12) United States Patent
Kim et al.

(10) Patent No.:    US 12,695,809 B2
(45) Date of Patent:    Jul. 28, 2026

(54) TARGET SERVICES FOR AUTHENTICATION AND AUTHORIZATION

(71) Applicant: QUALCOMM Incorporated, San Diego, CA (US)

(72) Inventors: Sunghoon Kim, San Diego, CA (US); Lenaig Genevieve Chaponniere, La Jolla, CA (US); Waqar Zia, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 18/339,016

(22) Filed: Jun. 21, 2023

(65) Prior Publication Data

US 2024/0048632 A1    Feb. 8, 2024

Related U.S. Application Data

(60) Provisional application No. 63/395,712, filed on Aug. 5, 2022.

(51) Int. Cl.
*H04L 67/51*    (2022.01)
*H04L 9/40*    (2022.01)
*H04W 8/18*    (2009.01)

(52) U.S. Cl.
CPC .............. *H04L 67/51* (2022.05); *H04L 63/08* (2013.01); *H04W 8/18* (2013.01)

(58) Field of Classification Search
CPC ........... H04L 67/51; H04L 63/08; H04W 8/18
See application file for complete search history.

(56) References Cited

U.S. PATENT DOCUMENTS 7,073,055 B1 *    7/2006    Freed ................... H04L 63/0823
                                                           726/4
7,451,224 B1 *    11/2008    Stamler ............... H04L 41/0846
                                                           709/228
2006/0183463 A1 *    8/2006    Falk .................... H04W 12/069
                                                           455/411

(Continued)

OTHER PUBLICATIONS

International Search Report and Written Opinion—PCT/US2023/068919—ISA/EPO—Sep. 27, 2023 (2206453WO).

(Continued)

*Primary Examiner* — Sm A Rahman
(74) *Attorney, Agent, or Firm* — Holland & Hart LLP/QUALCOMM Incorporated

(57)    ABSTRACT

Methods, systems, and devices for wireless communications are described. The described techniques support authentication and authorization (AA) for various services provided by a network and supported by a user equipment (UE). A UE may transmit a container to a first network entity requesting AA for a first service. The container may include an indicator of the first service, and the indicator may indicate or distinguish the first service from multiple services. The first network entity may query a third network entity based on the indicator of the first service to discover a second network entity supporting AA for the first service. The first network entity may then transmit an indicator of the first service to the second network entity, and the second network entity may select a fourth network entity supporting AA for the first service.

36 Claims, 15 Drawing Sheets

(56) References Cited

U.S. PATENT DOCUMENTS

| | | | | |
|---|---|---|---|---|
| 2012/0246712 | A1* | 9/2012 | Xie | H04L 63/0281 |
| | | | | 726/14 |
| 2015/0282042 | A1* | 10/2015 | Griot | H04W 24/08 |
| | | | | 370/329 |
| 2017/0171256 | A1* | 6/2017 | Liang | H04W 36/26 |
| 2019/0028961 | A1* | 1/2019 | Faccin | H04W 8/02 |
| 2020/0213290 | A1 | 7/2020 | Tan et al. | |
| 2021/0105451 | A1* | 4/2021 | Oyman | H04N 19/597 |
| 2021/0136548 | A1 | 5/2021 | Mladin et al. | |
| 2023/0308853 | A1* | 9/2023 | Ding | G06F 9/5072 |

OTHER PUBLICATIONS

3GPP: "3rd Generation Partnership Project, Technical Specification Group Core Network and Terminals, 5G System, Uncrewed Aerial System Service Supplier (USS) Services, Stage 3 (Release 17)", 3GPP TS 29.255 V17.1.0, Technical Specification, 3GPP Organizational Partners, Sophia Antipolis Valbonne, France, Jun. 2022, pp. 1-12.

3GPP: "3rd Generation Partnership Project, Technical Specification Group Core Network and Terminals, 5G System, Uncrewed Aerial Systems Network Function (UAS-NF), Aerial Management Services, Stage 3 (Release 17)", 3GPP TS 29.256 V17.1.0, Technical Specification, 3GPP Organizational Partners, Sophia Antipolis Valbonne, France, Jun. 2022, pp. 1-12.

3GPP: "3rd Generation Partnership Project, Technical Specification Group Core Network and Terminals, Non-Access-Stratum (NAS) Protocol for 5G System (5GS), Stage 3, (Release 17)", 3GPP TS 24.501 V17.7.1, Technical Specification, 3GPP Organizational Partners, Sophia Antipolis Valbonne, France, Jun. 2022, 49 Pages, Section 6.3.1A, Section 6.4.1.2, Section 6.4.2.2, Section 9.11.2.10.

3GPP: "3rd Generation Partnership Project, Technical Specification Group Services and System Aspects, Procedures for the 5G System (5GS), Stage 2 (Release 17)", 3GPP TS 23.502 V17.5.0, Technical Specification, 3GPP Organizational Partners, Sophia Antipolis Valbonne, France, Jun. 2022, 28 Pages, Section 5.2.7.

3GPP: "3rd Generation Partnership Project, Technical Specification Group Services and System Aspects, Support of Uncrewed Aerial Systems (UAS) Connectivity, Identification and Tracking, Stage 2 (Release 17)", 3GPP TS 23.256 V17.3.0, Technical Specification, 3GPP Organizational Partners, Sophia Antipolis Valbonne, France, Jun. 2022, 10 Pages, Section 5.2.3.

* cited by examiner

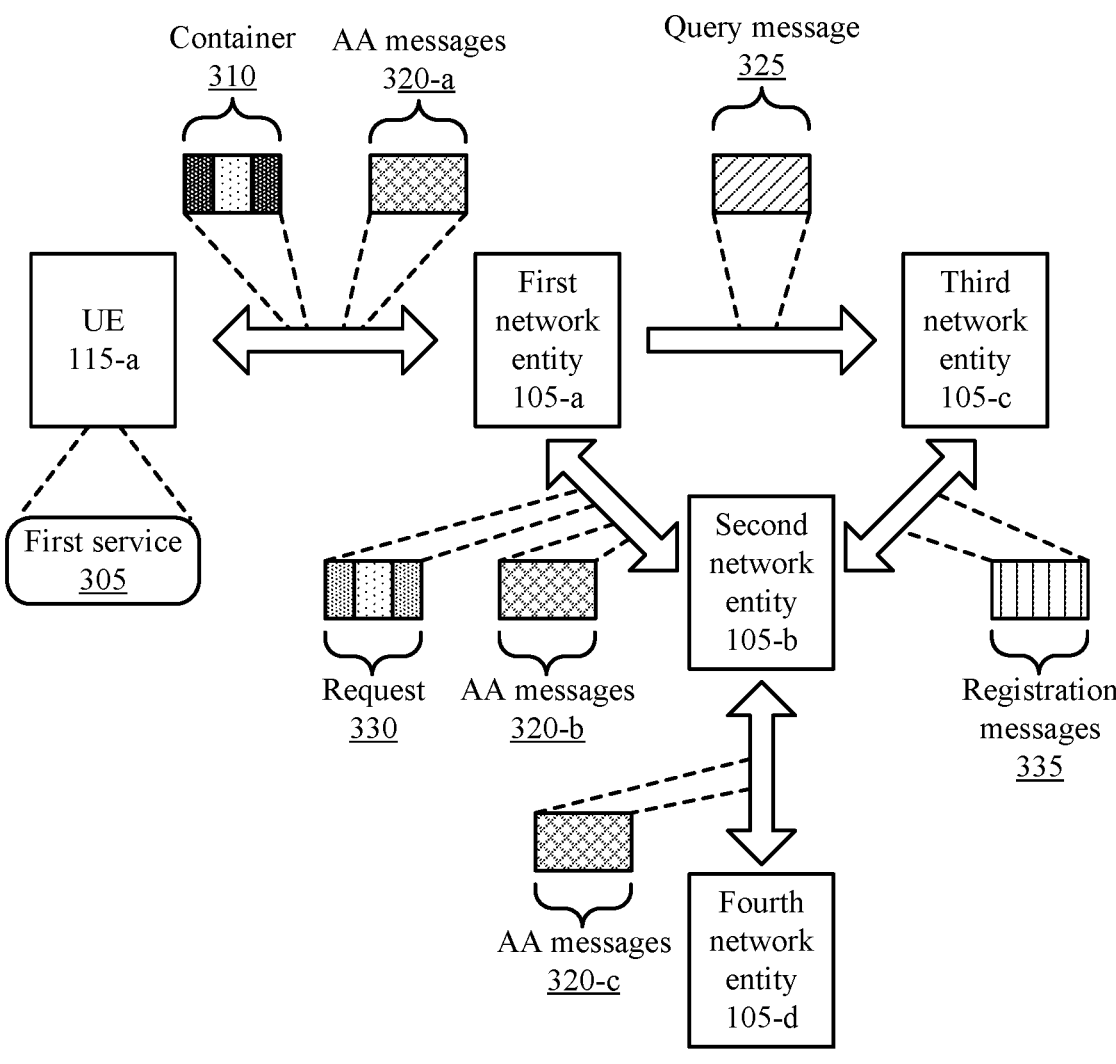
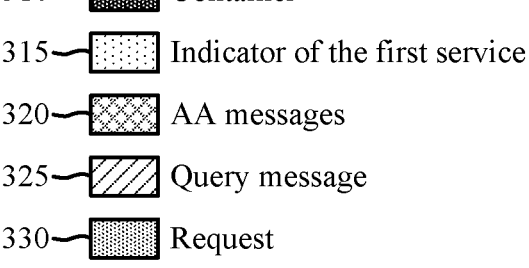
310 — ▨ Container
315 — ▨ Indicator of the first service
320 — ▨ AA messages
325 — ▨ Query message
330 — ▨ Request
335 — ▨ Registration messages
300
FIG. 3

130

105

115

Network
Entity

Transceiver

810

Antenna

815

Communications
Manager

820

Memory

Code

830

825

Processor

835

840

805

800

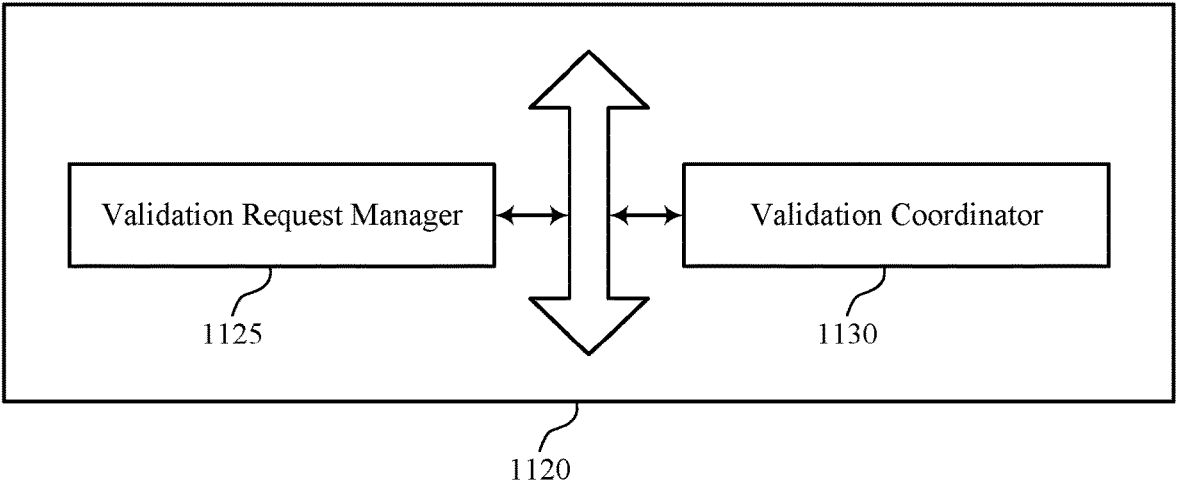
Validation Request Manager
1125
Validation Coordinator
1130
1120
1100
FIG. 11

Figure 13:
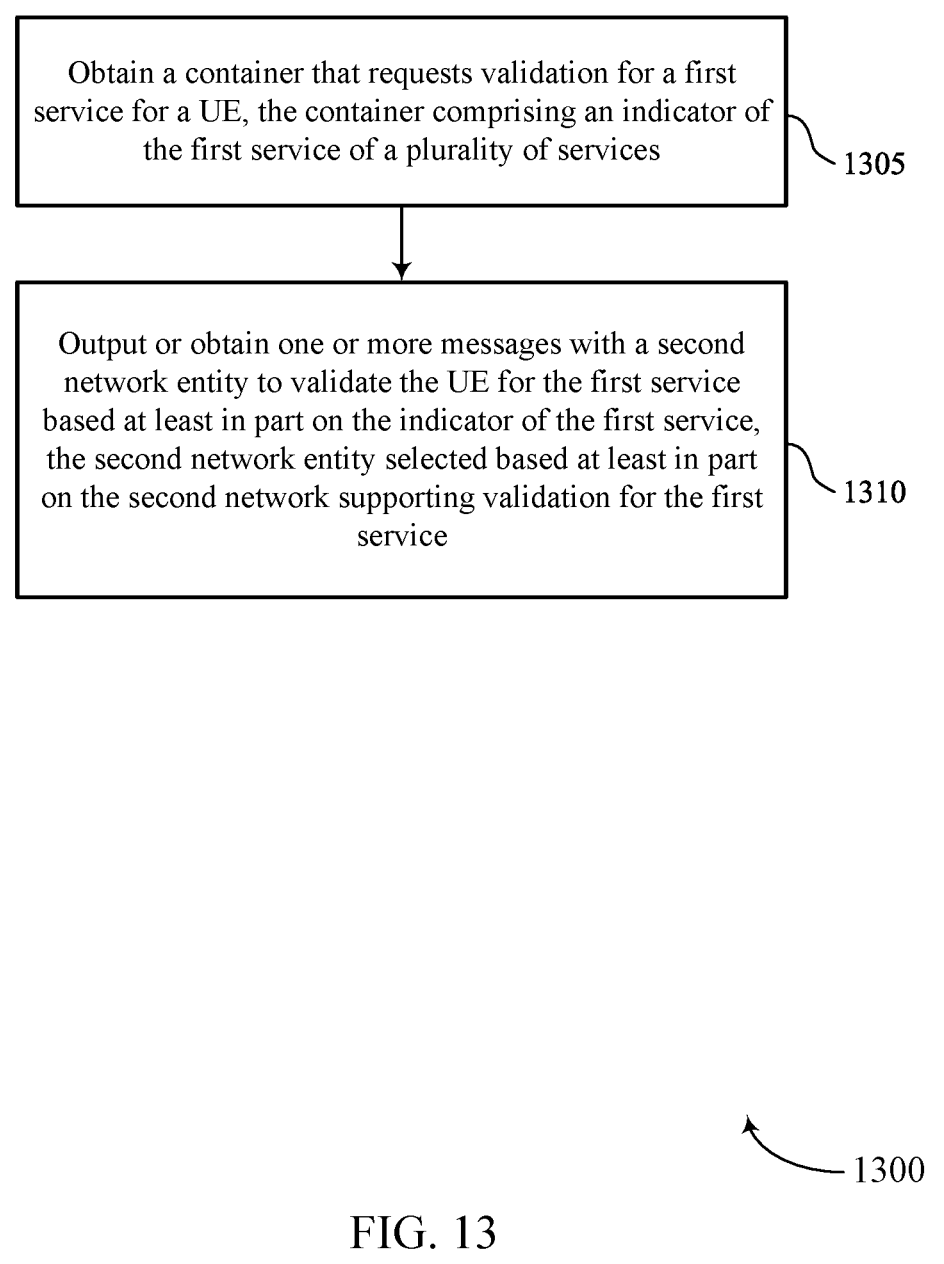

Obtain a container that requests validation for a first service for a UE, the container comprising an indicator of the first service of a plurality of services

1305

Output or obtain one or more messages with a second network entity to validate the UE for the first service based at least in part on the indicator of the first service, the second network entity selected based at least in part on the second network supporting validation for the first service

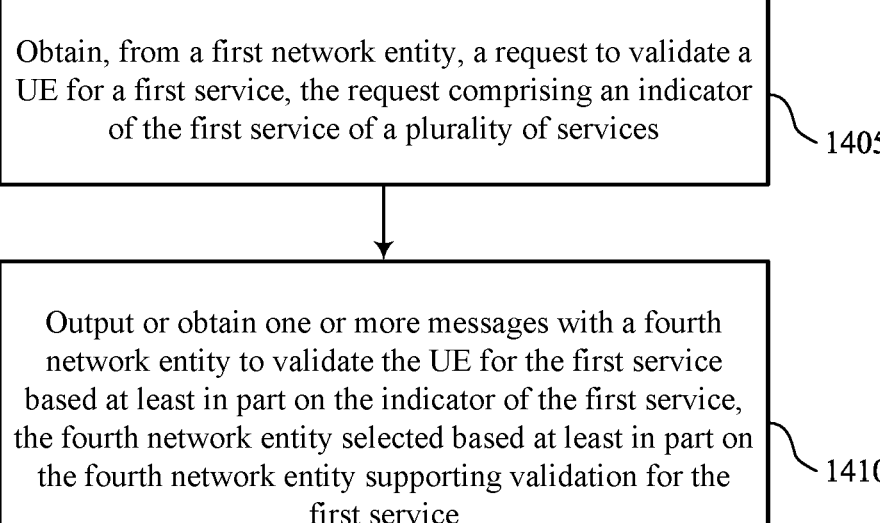

Obtain, from a first network entity, a request to validate a UE for a first service, the request comprising an indicator of the first service of a plurality of services

1405

Output or obtain one or more messages with a fourth network entity to validate the UE for the first service based at least in part on the indicator of the first service, the fourth network entity selected based at least in part on the fourth network entity supporting validation for the first service

Output, to a first network entity, a container that requests
validation for a first service for the UE, the container
comprising an indicator of the first service of a plurality
of services

1505

Output or obtain one or more messages with the first
network entity to validate the UE for the first service
based at least in part on transmitting the container

1510

1500

TARGET SERVICES FOR AUTHENTICATION AND AUTHORIZATION

CROSS REFERENCE

The present application for patent claims the benefit of U.S. Provisional Patent Application No. 63/395,712 by KIM et al., entitled "TARGET SERVICES FOR AUTHENTICA-TION AND AUTHORIZATION," filed Aug. 5, 2022, assigned to the assignee hereof, and expressly incorporated by reference herein.

INTRODUCTION

The following relates to wireless communications, includ-ing managing authentication and authorization (AA).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wire-less multiple-access communications system may include one or more network entities, each supporting wireless communication for communication devices, which may be known as user equipment (UE).

SUMMARY

A method for wireless communication at a first network entity is described. The method may include obtaining a container that requests validation for a first service for a UE, the container including an indicator of the first service of a set of multiple services and outputting or obtaining one or more messages with a second network entity to validate the UE for the first service based on the indicator of the first service, the second network entity selected based on the second network entity supporting validation for the first service.

An apparatus for wireless communication at a first net-work entity is described. The apparatus may include one or more processors and one or more memories coupled with the one or more processors, the one or more processors coupled with the one or more memories and individually or collec-tively configured to cause the first network entity to obtain a container that requests validation for a first service for a UE, the container including an indicator of the first service of a set of multiple services and output or obtain one or more messages with a second network entity to validate the UE for the first service based on the indicator of the first service, the second network entity selected based on the second network entity supporting validation for the first service. Another apparatus for wireless communication at a first network entity is described. The apparatus may include means for obtaining a container that requests validation for a first service for a UE, the container including an indicator of the first service of a set of multiple services and means for outputting or obtaining one or more messages with a second network entity to validate the UE for the first service based on the indicator of the first service, the second network entity selected based on the second network entity support-ing validation for the first service.

A non-transitory computer-readable medium storing code for wireless communication at a first network entity is described. The code may include instructions executable by one or more processors to obtain a container that requests validation for a first service for a UE, the container including an indicator of the first service of a set of multiple services and output or obtain one or more messages with a second network entity to validate the UE for the first service based on the indicator of the first service, the second network entity selected based on the second network entity support-ing validation for the first service.

Some examples of the method, apparatuses, and non-transitory computer-readable medium described herein may further include operations, features, means, or instructions for outputting or obtaining, based on the indicator of the first service, a query message with a third network entity to discover the second network entity supporting validation for the first service.

In some examples of the method, apparatuses, and non-transitory computer-readable medium described herein, and the method, apparatuses, and non-transitory computer-read-able medium may include further operations, features, means, or instructions for outputting or obtaining the one or more messages based on a service identifier corresponding to the service-level device identifier, the second network entity selected based on the service identifier.

Some examples of the method, apparatuses, and non-transitory computer-readable medium described herein may further include operations, features, means, or instructions for outputting, to the second network entity, an indication of the service identifier or an indication of a target address associated with the service identifier.

Some examples of the method, apparatuses, and non-transitory computer-readable medium described herein may further include operations, features, means, or instructions for verifying a subscription of the UE to determine the service identifier corresponding to the service-level device identifier.

In some examples of the method, apparatuses, and non-transitory computer-readable medium described herein, the subscription includes the service identifier indicating a capa-bility of the UE to support the plurality of services. In some examples of the method, apparatuses, and non-transitory computer-readable medium described herein, and the method, apparatuses, and non-transitory computer-readable medium may include further operations, features, means, or instructions for outputting or obtaining the one or more messages based on a service name corresponding to the service-level device identifier, the second network entity selected based on the service name.

Some examples of the method, apparatuses, and non-transitory computer-readable medium described herein may further include operations, features, means, or instructions for outputting, to the second network entity, an indication of the service name or an indication of a target address asso-ciated with the service name.

In some examples of the method, apparatuses, and non-transitory computer-readable medium described herein, the service name corresponding to the service-level device identifier may be based on a format of the service-level device identifier.

In some examples of the method, apparatuses, and non-transitory computer-readable medium described herein, and the method, apparatuses, and non-transitory computer-readable medium may include further operations, features, means, or instructions for outputting or obtaining the one or more messages based on a service name corresponding to the payload type, the second network entity selected based on the service name.

Some examples of the method, apparatuses, and non-transitory computer-readable medium described herein may further include operations, features, means, or instructions for outputting, to the second network entity, an indication of the service name or an indication of a target address associated with the service name.

In some examples of the method, apparatuses, and non-transitory computer-readable medium described herein, the service name corresponding to the payload type may be based on a mapping of the payload type to the service name in accordance with a service-level agreement between an operator and a service provider.

In some examples of the method, apparatuses, and non-transitory computer-readable medium described herein, the indicator of the first service includes a server address in the container and the method, apparatuses, and non-transitory computer-readable medium may include further operations, features, means, or instructions for outputting, to the second network entity, an indication of the server address.

In some examples of the method, apparatuses, and non-transitory computer-readable medium described herein, and the method, apparatuses, and non-transitory computer-readable medium may include further operations, features, means, or instructions for outputting or obtaining the one or more messages based on a category of services corresponding to the payload type, the category of services including the first service, the second network entity selected based on the category of services.

In some examples of the method, apparatuses, and non-transitory computer-readable medium described herein, the container further includes a server address for the first service and the method, apparatuses, and non-transitory computer-readable medium may include further operations, features, means, or instructions for outputting, to the second network entity, an indication of the server address for the first service.

In some examples of the method, apparatuses, and non-transitory computer-readable medium described herein, verifying, based on the indicator of the first service, that a subscription of the UE supports the first service.

In some examples of the method, apparatuses, and non-transitory computer-readable medium described herein, the container includes a payload for a validation procedure.

A method for wireless communication at a second network entity is described. The method may include obtaining, from a first network entity, a request to validate a UE for a first service, the request including an indicator of the first service of a set of multiple services and outputting or obtaining one or more messages with a fourth network entity to validate the UE for the first service based on the indicator of the first service, the fourth network entity selected based on the fourth network entity supporting validation for the first service.

An apparatus for wireless communication at a second network entity is described. The apparatus may include one or more processors and one or more memories coupled with the one or more processors, the one or more processors coupled with the one or more memories and individually or collectively configured to cause the second network entity to obtain, from a first network entity, a request to validate a UE for a first service, the request including an indicator of the first service of a set of multiple services and output or obtain one or more messages with a fourth network entity to validate the UE for the first service based on the indicator of the first service, the fourth network entity selected based on the fourth network entity supporting validation for the first service.

Another apparatus for wireless communication at a second network entity is described. The apparatus may include means for obtaining, from a first network entity, a request to validate a UE for a first service, the request including an indicator of the first service of a set of multiple services and means for outputting or obtaining one or more messages with a fourth network entity to validate the UE for the first service based on the indicator of the first service, the fourth network entity selected based on the fourth network entity supporting validation for the first service.

A non-transitory computer-readable medium storing code for wireless communication at a second network entity is described. The code may include instructions executable by one or more processors to obtain, from a first network entity, a request to validate a UE for a first service, the request including an indicator of the first service of a set of multiple services and output or obtain one or more messages with a fourth network entity to validate the UE for the first service based on the indicator of the first service, the fourth network entity selected based on the fourth network entity supporting validation for the first service.

Some examples of the method, apparatuses, and non-transitory computer-readable medium described herein may further include operations, features, means, or instructions for outputting, to a third network entity, an indication that the second network entity supports the first service and obtaining, from the third network entity, an indication of a target address of the fourth network entity corresponding to the indicator of the first service, the fourth network entity selected based on obtaining the indication of the target address of the fourth network entity.

In some examples of the method, apparatuses, and non-transitory computer-readable medium described herein, outputting the indication that the second network entity supports the first service may include operations, features, means, or instructions for outputting, to the third network entity, an indication of a range of domain names corresponding to the first service supported by the second network entity.

In some examples of the method, apparatuses, and non-transitory computer-readable medium described herein, outputting the indication that the second network entity supports the first service may include operations, features, means, or instructions for outputting, to the third network entity, an indication of a category of services supported by the second network entity, the category of services including the first service.

In some examples of the method, apparatuses, and non-transitory computer-readable medium described herein, the indicator of the first service includes a service identifier, a service name, a server address, or a combination thereof.

A method for wireless communication at a UE is described. The method may include outputting, to a first network entity, a container that requests validation for a first service for the UE, the container including an indicator of the first service of a set of multiple services and outputting or obtaining one or more messages with the first network entity to validate the UE for the first service based on transmitting the container.

An apparatus for wireless communication at a UE is described. The apparatus may include one or more processors and one or more memories coupled with the one or more processors, the one or more processors coupled with the one or more memories and individually or collectively configured to cause the UE to output, to a first network entity, a container that requests validation for a first service for the UE, the container including an indicator of the first service of a set of multiple services and output or obtain one or more messages with the first network entity to validate the UE for the first service based on transmitting the container.

Another apparatus for wireless communication at a UE is described. The apparatus may include means for outputting, to a first network entity, a container that requests validation for a first service for the UE, the container including an indicator of the first service of a set of multiple services and means for outputting or obtaining one or more messages with the first network entity to validate the UE for the first service based on transmitting the container.

A non-transitory computer-readable medium storing code for wireless communication at a UE is described. The code may include instructions executable by one or more processors to output, to a first network entity, a container that requests validation for a first service for the UE, the container including an indicator of the first service of a set of multiple services and output or obtain one or more messages with the first network entity to validate the UE for the first service based on transmitting the container.

In some examples of the method, apparatuses, and non-transitory computer-readable medium described herein, the indicator of the first service includes a service-level device identifier, the service-level device identifier corresponding to a service identifier or a service name of the first service.

In some examples of the method, apparatuses, and non-transitory computer-readable medium described herein, the indicator of the first service includes a payload type of a payload in the container, the payload type corresponding to a service name of the first service.

In some examples of the method, apparatuses, and non-transitory computer-readable medium described herein, the indicator of the first service includes a server address.

In some examples of the method, apparatuses, and non-transitory computer-readable medium described herein, the indicator of the first service includes a payload type of a payload in the container, the payload type corresponding to a category of services including the first service and the container further includes a server address for the first service.

BRIEF DESCRIPTION OF THE DRAWINGS

FIG. 3 illustrates an example of a wireless communications system that supports target services for AA in accordance with one or more aspects of the present disclosure.

FIG. 11 shows a block diagram of a communications manager that supports target services for AA in accordance with one or more aspects of the present disclosure.

FIGS. 13 through 15 show flowcharts illustrating methods that support target services for AA in accordance with one or more aspects of the present disclosure.

DETAILED DESCRIPTION

Figure 1:
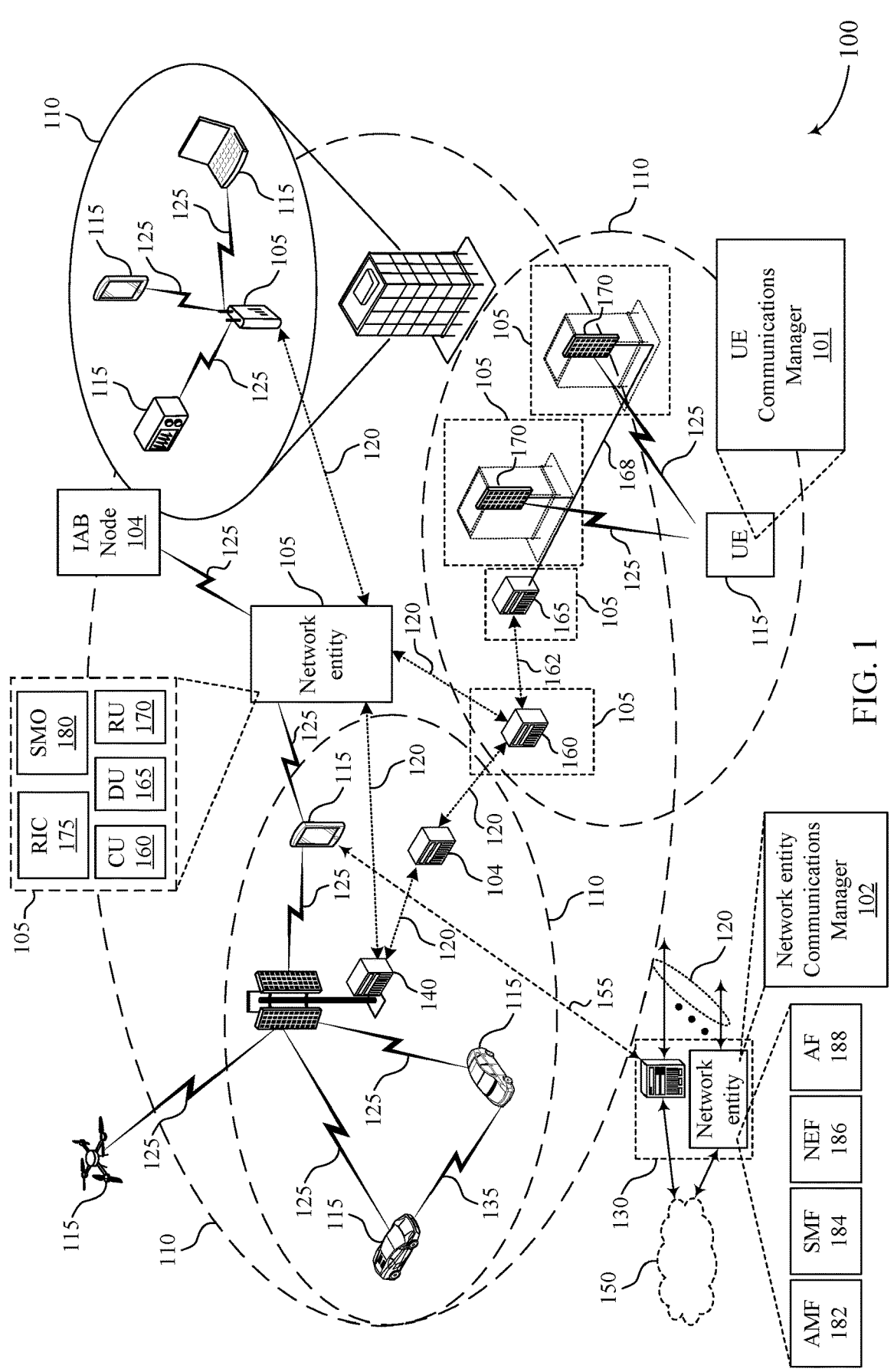
FIG. 1 illustrates an example of a wireless communications system that supports target services for AA in accordance with one or more aspects of the present disclosure.

Some wireless communications systems may provide multiple services to a UE to support different functionalities and applications at the UE. Examples of such services may include gaming services, streaming services, extended reality services, virtual office services, aerial services, vehicle-to-everything (V2X) services, edge computing services, and others. Before providing a service to a UE or enabling a service for a UE, a network may validate the UE for the service. A network may refer to a wireless communications system that includes network entities facilitating communications with a UE, and validation of a UE for a service may refer to authenticating and authorizing the UE for the service. Authentication of a UE may refer to the verification of a UE for a service (e.g., verifying that the UE has permissions for a service), and authorization may refer to the determination of access rights at a UE for a service. One or more application and programming interfaces (APIs) may be established in a network to facilitate AA for a UE for services such as aerial services. Aerial services may refer to services provided to aerial UEs, and aerial UEs may refer to UEs capable of flying or maneuvering through the air. Various network entities may communicate via these APIs to authenticate and authorize a UE for aerial services. In some examples, in addition to aerial services, it may be appropriate for a network to support AA for other services. However, techniques for facilitating AA for different services may be undefined or underdeveloped, and a network may be unable to securely provide different services to a UE (e.g., services other than aerial services). For instance, if a network provides services to a UE without AA, unauthenticated and unauthorized UEs may have access to the services which may compromise the security of the network. Alternatively, if a network avoids providing services to a UE without AA (e.g., to maintain security), functionalities and applications at the UE that rely on these services may not be available to the UE.

The described techniques support AA for various services provided by a network and supported by a UE. A UE may request AA for a service from a network by transmitting a request for AA for the service to a session management function (SMF). The UE may specify the service in the request to the SMF by including an indicator of the service in the request. The indicator of the service may distinguish the service from multiple services. The SMF may receive the request from the UE and may select a network exposure function (NEF) that may provide AA to the UE for the service. In some examples, the SMF may query a network repository function (NRF) to discover the NEF. The SMF may transmit, to the NEF, an indication of the service for which the UE is requesting AA, and the NEF may select an application function (AF) that may provide AA to the UE for the service. Once an NEF and an AF supporting AA for the service are selected, the NEF and AF may authenticate and authorize the UE for the service.

A network may select an NEF and an AF supporting AA for a service based on the service, and different NEFs and AFs may support AA for various services (e.g., rather than only supporting AA for aerial services). As a result, UEs in a wireless communications system may have secure access to various services, and these UEs may have the capability to implement different functionalities and a range of applications supported by these services. For example, the UEs may have the capability to implement the different functionalities and the range of applications supported by these services, and the UE's subscription information may indicate a quantity of services the UE is capable of supporting. In addition, because the described techniques may enable a network to provide AA for various services, new applications and functionalities at a UE may be introduced without compromising the security of the network and the security of other devices in the network. For example, new applications and functionalities at the UE may, utilize a same AA procedure as the applications and functionalities described herein (e.g., as opposed to a new AA procedure).

Aspects of the disclosure are initially described in the context of wireless communications systems. Aspects of the disclosure are further illustrated by and described with reference to apparatus diagrams, system diagrams, and flowcharts that relate to target services for AA.

FIG. 1 illustrates an example of a wireless communications system 100 that supports target services for AA in accordance with one or more aspects of the present disclosure. The wireless communications system 100 may include one or more network entities 105, one or more UEs 115, and a core network 130. In some examples, the wireless communications system 100 may be an LTE network, an LTE-A network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support target services for AA as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by)

the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may include one or more network entities 105, such as an AMF 182, an SMF 184, an NEF 186, and an AF 188. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Techniques described herein, in addition to or as an alternative to be carried out between UEs 115 and network entities 105, may be implemented via additional or alternative wireless devices, including IAB nodes 104, DUs 165, CUs 160, RUs 170, and the like. For example, in some implementations, aspects described herein may be implemented in the context of a disaggregated RAN architecture (e.g., open RAN (O-RAN) architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities based on which functions (e.g., MAC functions, baseband functions, RF functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more network entities 105 may include CUs 160, DUs 165, and RUs 170 and may be referred to as donor network entities 105 or IAB donors. One or more DUs 165 (e.g., and/or RUs 170) associated with a donor network entity 105 may be partially controlled by CUs 160 associated with the donor network entity 105. The one or more donor network entities 105 (e.g., IAB donors) may be in communication with one or more additional network entities 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of network entities 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP) functionality and signaling. The at least one DU 165 and/or RU 170 may host lower layer, such as layer 1 (L1) and layer 2 (L2) (e.g., RLC, MAC, physical (PHY)) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network and may act as parent node to IAB nodes 104.

For example, the DU 165 of IAB donor may relay transmissions to UEs 115 through IAB nodes 104 and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for large round trip times in random access channel procedures as described herein. For example, some operations described as being performed by a UE 115 or a network entity 105 may additionally or alternatively be performed by components of the disaggregated RAN architecture (e.g., IAB nodes, DUs, CUs, etc.).

The wireless communications system 100 may support unmanned aircraft systems (UASs). Some UEs 115 in wireless communications system 100 may be aerial UEs 115 capable of flying or maneuvering through the air. For example, an aerial service may refer to a wireless communications system that includes non-terrestrial communication devices such as satellites, zeppelins, dirigibles, balloons, or drones, unmanned aerial vehicle (UAV), or another aerial device or device capable of air to ground (ATG) communications. Such aerial UEs 115 may support uplink or downlink communications with one or more cells or sidelink communications with each other. To facilitate the uplink, downlink, and sidelink communications by aerial UEs 115, the wireless communications system 100 may define a spectrum dedicated to aerial UEs 115. The dedicated spectrum may be for uplink and downlink communications between aerial UEs 115 and one or more cells (e.g., over a Uu interface), or the dedicated spectrum may be for sidelink communications between aerial UEs 115 (e.g., over a PC5 interface). In addition to the dedicated spectrum, aerial UEs 115 may operate in other wireless spectrums. The wireless communications system 100 may support efficient techniques for operation of aerial UEs 115 in dedicated spectrum and other spectrums. An aerial UE 115 may be, for example, a UAV or drone, or a UE 115 installed in a UAV or drone.

The wireless communications system 100 may support an AA procedure to authenticate and authorize a UE 115 for aerial services. The AA procedure may be a part of a NAS procedure for aerial services. The NAS procedure may include operations by a UE 115 and a network. A UE 115 supporting UAS services may include a service-level device identifier (ID) in a request for AA, and the service-level device identifier may trigger a service-level AA procedure. The service-level device identifier may refer to a unique identifier of a service at a UE 115. An SMF may receive the request for AA from the UE 115, and the SMF may check a subscription of the UE 115 for UAS. The SMF may then trigger a UAV USS AA (UUAA) procedure or reject the request from the UE (e.g., with a cause of 'UAS services not allowed').

Various messages may be exchanged between a UE 115 and a network and between network entities 105 in the network to facilitate an AA procedure for aerial services. Examples of these messages include a service-level AA container (SLAC) carrying the request for AA from the UE 115 to the SMF, a NEF authentication message from the SMF to an NEF, and a AF authentication message from the NEF to an AF (e.g., an AF). A UE 115 may transmit the SLAC as part of a session management (SM) NAS, service-level AA procedure or to initiate the SM NAS, service-level AA procedure. The SMF may transmit the NEF authentication message to the NEF along with other messages to facilitate AA for aerial services, and the NEF may transmit the AF authentication message to the AF along with other messages to facilitate AA for aerial services.

An SLAC may include fields for a service-level-AA device identifier, a service-level-AA server address, a service-level-AA response, a service-level-AA payload type, a service-level-AA pending indication, and a service-level-AA payload. The service-level-AA device identifier field may include a service-level device identifier information element identifier, a service-level device identifier length, and the service-level-AA device identifier. The service-level-AA response field may include a service-level-AA response or a command and control (C2) AA response. A service-level-AA payload type field may include eight bits where a first value indicates a UUAA payload, a second value indicates a C2 authorization payload, and all other values are reserved. In some examples, payload type encoding in an SLAC for UUAA and C2 authorization may be specified.

An NEF authentication message may be modeled according to an Nnef_auth data model and may include UAV authentication information, an authentication notification, a UAV authentication response, a UAV authentication failure, an authentication result, and a notification type. The UAV authentication information may include a generic public subscription identifier (GPSI), a service-level device identifier, an internet protocol (IP) address of a UE 115, an authentication message, a permanent equipment identifier (PEI), an authentication server address, an authentication notification uniform resource identifier (URI), a data network name (DNN), single network slice selection assistance information (S-NSSAI), UE location information, and a network function type (e.g., AMF or SMF). The authentication notification may include a GPSI, service-level device identifier, an authorization message, an authentication session correlation identifier, a notification type, and a revoke cause. The UAV authentication response may include a GPSI, an authentication result, an authentication message, a service-level device identifier, and an authentication session correlation identifier. The UAV authentication failure may include an error message and a UAS resource release indication. The authentication result may include a success message. The notification type may include a reauthentication, an update of authorization data, and a revoke message.

An AF authentication message may be modeled according to an Naf_auth data model and may include UAV authentication information, a UAV authentication response, an authentication result, a reauthorization or revoke notification, a notification type, problem details associated with AA, additional information for AA, and a revoke cause. The UAV authentication information may include a GPSI, a service-level device identifier, an IP address of a UE 115, an authentication message, a PEI, an authentication notification URI, a notification correlation identifier, UE location information, and a supported feature. The UAV authentication response may include a GPSI, an authentication result, an authentication message, a service-level device identifier, and a supported feature. An authentication result may include a success message. A reauthorization or revoke notification may include a GPSI, a service-level device identifier, an IP address of a UE 115, an authentication message, a notification correlation identifier, and a notification type. The notification type may indicate a reauthentication, reauthorization, or a revoke notification. The additional information for AA may include a UAS resource release indication.

In some examples, in addition to aerial services, the wireless communications system 100 may provide other services to UEs 115 to support different functionality and applications at the UEs 115. Examples of services supported by the wireless communications system 100 may include gaming services, streaming services, extended reality services, virtual office services, aerial services, and others. In some examples, it may be appropriate for the wireless communications system 100 to support AA for various services provided by the wireless communications system 100. For instance, it may be appropriate to adapt an AA procedure to make the AA procedure generic (e.g., not limited to UAS features). A NAS procedure and container may be introduced to cope with any vertical service supporting AA. A vertical service or a vertical may refer to a category of services. Examples of vertical services include gaming services, augmented reality (AR) services, virtual reality (VR) services, metaverse services, and others, and each of these vertical services may include multiple services (e.g., a first, second, and third gaming service, AR service, VR service, or metaverse service).

In some implementations, techniques for facilitating AA for different or multiple services may be undefined or underdeveloped. For instance, operations at a UE 115 and a network for an AA procedure (e.g., including trigger, accept, and reject messages) may not be specified for generic use cases. That is, there may be no support for AA for services other than aerial services. Further, although an authentication message (e.g., 'authmsg') from an SMF may be used for any service, a data model and descriptions for an NEF authentication message may be UAS-specific. Similarly, although an authentication message (e.g., 'authmsg') from an NEF may be used for any service, a data model and descriptions for an AF authentication message may be UAS-specific.

If multiple services are available to UEs 115, it may be appropriate to adapt an AA procedure (e.g., update one or more APIs for the AA procedure) to enable AA for multiple services (e.g., vertical services). For instance, it may be appropriate to allow for the selection of network functions (e.g., an NEF or AF) supporting a target function or service. In an example, if a UE 115 is requesting AA for service X, it may be appropriate to define how a network identifies that a service for which the UE is requesting AA is service X, and it may be appropriate to define how to select network functions for an AA procedure for service X. An SMF may identify a vertical service for which a UE 115 is requesting AA, and the SMF may select a proper NEF which may connect the UE 115 to an AF supporting the vertical service (e.g., a target vertical service). The NEF may then select the AF (e.g., the target AF).

In some examples, a service-level identifier may be defined for all services supported by a UE 115, and a UE 115 may include a service-level device identifier in a request for AA. A subscription of a UE 115 (e.g., UE subscription) may allow a network to perform an AA procedure for the UE 115 for one or more services. An SMF may check a subscription of a UE 115 to determine if a vertical service for which AA is requested is allowed for the UE 115. In some cases, if a UE 115 is capable of supporting multiple services, there may be multiple services applicable for a single UE subscription (e.g., a first UE may have a subscription for service X, service Y, and service Z). In such cases, it may be appropriate for an SMF or NEF to identify a service for which a UE 115 is requesting AA.

The wireless communications system 100 may support efficient techniques to facilitate AA for various services. A UE 115 may transmit a container to a first network entity 105 (e.g., an SMF) requesting AA for a first service. The container may refer to an object carrying information or a composition of information elements. The container may include an indicator of the first service, and the indicator may indicate or distinguish the first service from multiple services. The first network entity 105 may receive the container from the UE 115 and may select a second network entity 105 (e.g., an NEF) supporting AA for the first service. In some examples, the first network entity 105 may query a third network entity 105 (e.g., an NRF) to discover the second network entity 105 supporting AA for the first service. The first network entity 105 may then transmit another indicator of the first service to the second network entity 105, and the second network entity 105 may select a fourth network entity 105 (e.g., an AF) supporting AA for the first service.

One or more devices in the wireless communications system 100 may include a UE communications manager 101, a network entity communications manager 102, or any combination thereof, which may be examples of communications managers as described herein with reference to FIGS. 5-12. The UE 115 and the network entity 105 may perform, via the communications managers, an AA procedure. For example, the UE 115 may output, to a first network entity 105, a container that requests AA for a first service for the UE 115, the container including an indicator of the first service of a set of multiple services. The UE 115 may also output or obtain one or more messages with the first network entity 105 to authenticate and authorize the UE 115 for the first service based on outputting the container. The first network entity 105 may obtain a container that requests AA for the first service for a UE 115, the container including an indicator of the first service of a set of multiple services. The first network entity 105 may also output or obtain one or more messages with a second network entity 105 to authenticate and authorize the UE 115 for the first service based on the indicator of the first service. The first network entity 105 may select the second network entity 105 based on the second network entity 105 supporting AA for the first service. The second network entity 105 may obtain, from the first network entity 105, a request to authenticate and authorize the UE 115 for the first service, the request including an indicator of the first service of a set of multiple services. The second network entity 105 may also output or obtain one or more messages with a fourth network entity 105 to authenticate and authorize the UE 115 for the first service based on the indicator of the first service. The second network entity 105 may select the fourth network entity 105 based on the fourth network entity 105 supporting AA for the first service. The communications managers may further be operable to perform the techniques described herein.

Figure 2:
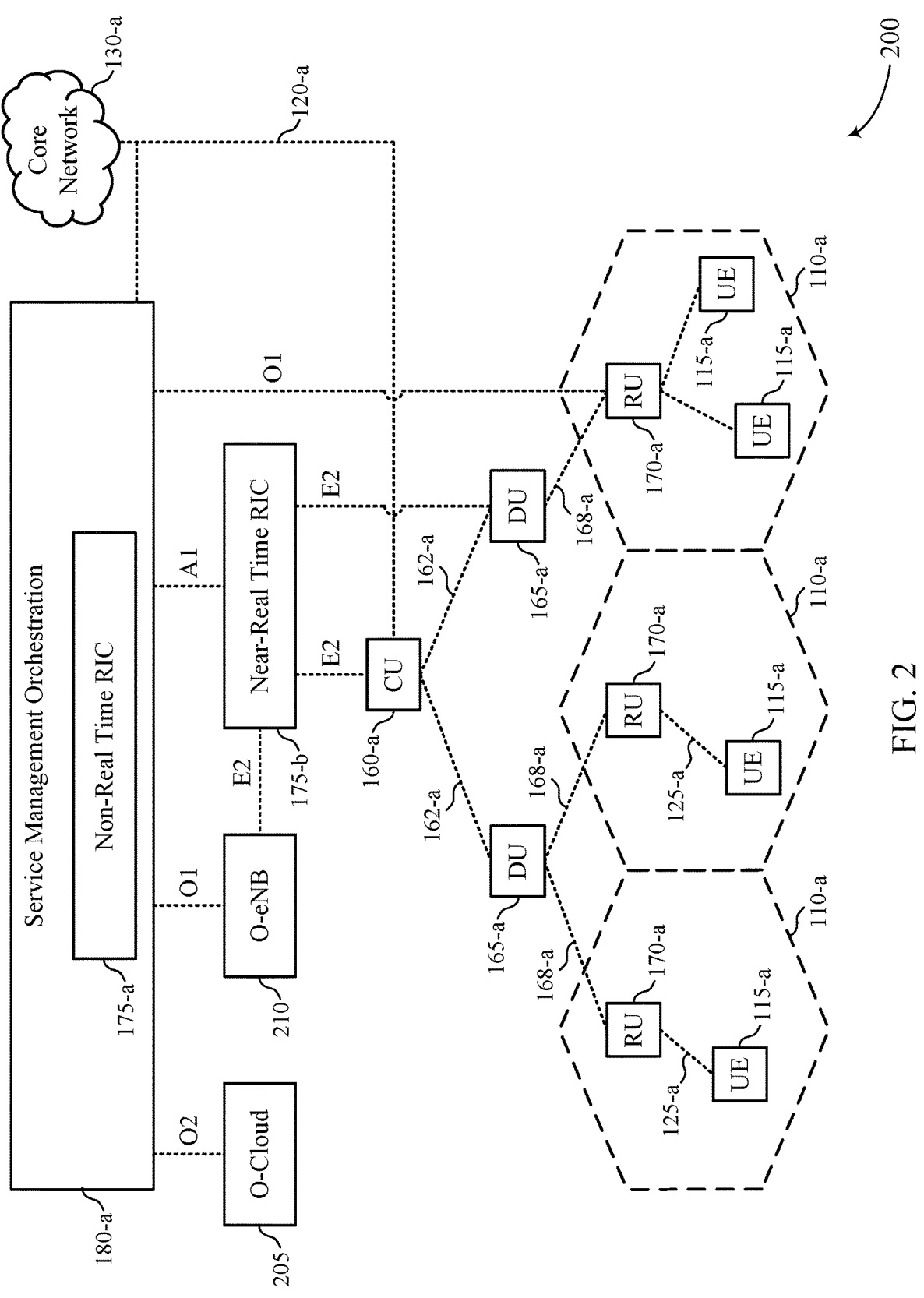
FIG. 2 illustrates an example of a network architecture that supports target services for AA in accordance with one or more aspects of the present disclosure.

FIG. 2 illustrates an example of a network architecture 200 (e.g., a disaggregated base station architecture, a disaggregated RAN architecture) that supports target services for AA in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements or targets which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled with or communicate with (e.g., via an A1 interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via 01) or via generation of RAN management policies (e.g., A1 policies).

The network architecture 200 may support efficient techniques to facilitate AA for various services. A UE 115 may transmit a container to a first network entity 105 (e.g., an SMF) requesting AA for a first service. The container may include an indicator of the first service, and the indicator may indicate or distinguish the first service from multiple services. The first network entity 105 may receive the container from the UE 115 and may select a second network entity 105 (e.g., an NEF) supporting AA for the first service. In some examples, the first network entity 105 may query a third network entity 105 (e.g., an NRF) to discover the second network entity 105 supporting AA for the first service. The first network entity 105 may then transmit another indicator of the first service to the second network entity 105, and the second network entity 105 may select a fourth network entity 105 (e.g., an AF) supporting AA for the first service.

FIG. 3 illustrates an example of a wireless communications system 300 that supports target services for AA in accordance with one or more aspects of the present disclosure. The wireless communications system 300 includes a UE 115-a, a first network entity 105-a, a second network entity 105-b, a third network entity 105-c, and a fourth network entity 105-d. The first network entity 105-a may be an example of an SMF, the second network entity 105-b may be an example of an NEF, the third network entity 105-c may be an example of an NRF, and the fourth network entity 105-d may be an example of an AF. The wireless communications system 300 may implement aspects of the wireless communications system 100 or the network architecture 200. For instance, the wireless communications system 300 may support efficient techniques to facilitate AA for various services.

The UE 115-a may support a first service 305, and the UE 115-a may output a container 310 to the first network entity 105-a to request AA for the first service 305 for the UE 115-a. The container 310 may include an indicator 315 of the first service 305 that distinguishes or identifies the first service 305 from multiple services provided by the network. The UE 115-a may also exchange or communicate (e.g., output or obtain) one or more AA messages 320-a with the first network entity 105-a to authenticate and authorize the UE 115-a for the first service 305. In some examples, the one or more AA messages 320-a may include the container 310.

The first network entity 105-a may obtain, from the UE 115-a, the container 310 that requests AA for the first service 305 for the UE 115-a. The container may include the indicator 315 of the first service 305. In some examples, the first network entity 105-a may output a query message 325 to discover the second network entity 105-b supporting AA for the first service 305. The query message 325 may include the indicator 315 of the first service 305. The first network entity 105-a may then obtain an indication that the second network entity 105-b supports AA for the first service 305 based on the query message 325. Once the first network entity 105-a discovers the second network entity 105-b, the first network entity 105-a may output a request 330 to authenticate and authorize the UE 115-a for the first service 305. The request may include the indicator 315 of the first service 305. The indicator 315 in the container 310 and the indicator 315 in the request 330 may the same or different. The first network entity 105-a may also exchange or communicate (e.g., output or obtain) one or more messages 320-b with the second network entity 105-b to authenticate or authorize the UE 115-a for the first service 305. In some examples, the one or more AA messages 320-b may include the request 330.

The second network entity 105-b may obtain, from the first network entity 105-a, the request 330 to authenticate and authorize the UE 115-a for the first service 305. In some examples, the second network entity 105-*b* may exchange or communicate (e.g., output or obtain) registration messages 335 with the third network entity 105-*c* to register with the third network entity 105-*c*. The second network entity 105-*b* may register with the third network entity 105-*c* before the first network entity 105-*a* transmits the query message 325 to discover the second network entity 105-*b*. That is, the first network entity 105-*a* may discover the second network entity 105-*b* based on the second network entity 105-*b* registering with the third network entity 105-*c*. In some examples, the second network entity 105-*b* may output, to the third network entity 105-*c*, an indication that the second network entity 105-*b* supports the first service 305. The second network entity 105-*b* may obtain, from the third network entity 105-*c*, an indication of a target address or a server address of the fourth network entity 105-*d* (e.g., a target AF address) corresponding to the indicator 315 of the first service 305. The second network entity 105-*b* may exchange or communicate (e.g., output or obtain) one or more messages 320-*c* with the fourth network entity 105-*d* to authenticate and authorize the UE 115-*a* for the first service 305.

The described messages or signaling exchanges (e.g., the AA messages 320) may enable the wireless communications system 300 to facilitate AA for various services. In some examples, there may be one or more options for the content included in each of the messages or signaling exchanged between network entities 105 to facilitate AA for the various services.

In one example, the indicator 315 of the first service 305 included in the container 310 may be a service-level device identifier. The service-level device identifier may be a unique value across vertical services. For instance, a single service-level device identifier may not be used for multiple vertical services. A mapping may be defined between service-level device identifiers and explicit service identifiers in a subscription of the UE 115-*a*. A service-level device identifier may identify or distinguish a service from one or more services at the UE 115-*a*, and a service identifier may identify or distinguish the service from one or more services in a network. A target address or server address of a network entity 105 (e.g., the fourth network entity 105-*d*) associated with a service identifier may be included in a subscription of the UE 115-*a* or in configuration information of a network function (e.g., the first network entity 105-*a*).

In another example, the indicator 315 of the first service 305 included in the container 310 may be a service-level device identifier that includes a service name. For instance, a portion of the service-level device identifier may be used to identify a target vertical service (e.g., the first service 305). In an example, if a service-level device identifier is 'service_name.unique_device_ID,' a network function (e.g., that receives the service-level device identifier) may identify that a target service is 'service name,'' and the target service may be used to select the second network entity 105-*b* and the fourth network entity 105-*b*. In another example, if a service-level device identifier is 'device_ID@service_name,' a network function may identify that a target service is 'service name,'' and the target service may be used to select the second network entity 105-*b* and the fourth network entity 105-*b*. A target address associated with a service name may be included in a subscription of the UE 115-*a* or in configuration information of a network function (e.g., the first network entity 105-*a*). An upper layer of the UE 115-*a* (e.g., an application client) may use a mobile network operator (MNO) compliant service-level device identifier, such that a portion of the service-level device identifier may be used to identify a target vertical service.

In yet another example, the indicator 315 of the first service 305 included in the container 310 may be a payload type (e.g., a service-level-AA payload type). A payload type in the container 310 (e.g., a reserved value) may have a one octet length value field with two values assigned (e.g., for a UUAA payload and a C2 authorization payload). The values assigned in the payload type in the container 310 may be expanded to include values for different services. An MNO and an application service provider (ASP) may have a Service Level Agreement (SLA) for a value of a payload type. For instance, 90 (hexadecimal) to FF (hexadecimal) may be reserved for MNO specific values, and one of them (e.g., A0 (hexadecimal)) may be assigned for the first service 305 (e.g., a service X). The UE 115-*a* may be configured to set the payload type to A0 (hexadecimal) if a requested application is for the first service 305. A network function may also be configured to identify or map the A0 (hexadecimal) value of the payload type to the first service 305. A target address associated with the first service 305 may be included in a subscription of the UE 115-*a* or in configuration information of a network function (e.g., the first network entity 105-*a*). An upper layer of the UE 115-*a* (e.g., an application client) may use a value of a payload type compliant to a serving public land mobile network (PLMN).

In yet another example, the indicator 315 of the first service 305 included in the container 310 may be a target address (e.g., a service-level-AA server address). In this example, a single service-level device identifier may be used for multiple vertical services. For example, if the UE 115-*a* has a subscription for a gaming service, a three-dimension (3D) streaming service, and a virtual office service, the UE 115-*a* may use a single service-level device identifier in the container 310 for one or more of these services, but a target address in the container 310 for each of the services may be different. The UE 115-*a* may provide a target address for the first service 305 to the first network entity 105-*a* in the container 310. If the UE 115-*a* does not provide a proper target address in the container 310, AA may fail for the first service 305. In an example, if the UE 115-*a* does not include a target address in the container 310, a network may fail to connect to a suitable fourth network entity 105-*d* (e.g., an AF). In this example, the network (e.g., the first network entity 105-*a* or the second network entity 105-*b*) may set a failure cause to 'wrong target service-level-AA server,' and the network may inform the UE 115-*a* of the failure and failure cause. The UE 115-*a* may try again for AA for the first service 305 by including a target address in a subsequent container. An upper layer of the UE 115-*a* (e.g., an application client) may be configured with a proper target address for the first service 305 and may pass the first service 305 to a NAS layer.

In yet another example, the indicator 315 of the first service 305 included in the container 310 may be a payload type, a target address, or both. The payload type may identify a vertical (e.g., a category) and the target address may identify a specific service provider of the vertical (e.g., if the UE 115-*a* has a subscription for a gaming service #A, a 3D streaming service #B, and a virtual office service #C). The payload type may identify a vertical, and more than one payload type may identify a single vertical. The payload type may be signaled from an application layer at the UE 115-*a* to a NAS layer at the UE 115-*a*. In some examples, more than one second network entities 105-*b* (e.g., NEFs) may be deployed, and a subset of the second network entities 105-*b* may interface with all anticipated verticals (e.g., as indicted by 'nefinfo' capabilities). Different verticals may be associated with different procedures (e.g., different or additional information elements (IEs) may be exchanged) or different network functions (NFs) (e.g., different sets of NEFs and AFs). A target address (e.g., an FQDN or port) may identify a server for the first service 305 and may be signaled by an application layer at the UE 115-*a* to be used by a core network. A target address may be included (or indicated by) in the container 310 unless some static configuration is used.

In each of the described examples, the indicator 315 of the first service 305 in the container 310 may be a service-level device identifier, a payload type, a target address (e.g., server address, target AF address, or target AF address), or a combination thereof in the container 310. When the first network entity 105-*a* receives the container 310 (e.g., a request) from the UE 115-*a*, the first network entity 105-*a* may check a subscription of the UE 115-*a*, check configuration information of a network function (e.g., the first network entity 105-*a*), or otherwise determine a service identifier, service name, target address, vertical, or target service associated with (e.g., mapped to or corresponding to) the indicator 315 of the first service 305. The first network entity 105-*a* may check if the first service 305 is allowed in the subscription of the UE 115-*a*. The first network entity 105-*a* may discover the second network entity 105-*b* supporting the service identifier, service name, target address, vertical, or target service by querying the third network entity 105-*c* with the service identifier, service name, target address, vertical, or target service.

When the first network entity 105-*a* requests AA for the first service 305 for the UE 115-*a* (e.g., requests Nnef Auth API), the first network entity 105-*a* may include the service identifier, service name, target address, vertical, or target service in the request 330. For instance, the indicator 315 of the first service 305 in the request 330 may be the service identifier, service name, target address, vertical, or target service. The second network entity 105-*b* may register to the third network entity 105-*c* with the service identifier, service name, target address, vertical, or target service supported by the second network entity 105-*b* (e.g., encoded in an 'nefinfo' data type), and the second network entity 105-*b* may be configured with the target address for the service identifier, service name, target address, vertical, or target service. In some examples, the second network entity 105-*b* may register to the third network entity 105-*c* with a frequency-domain domain name (FQDN) range (e.g., encoded in an 'nefinfo' data type) corresponding to a target address of a network entity 105 (e.g., the fourth network entity 105-*d*) to which the second network entity 105-*b* may connect. In some examples, the second network entity 105-*b* (e.g., NEF) supporting a specific vertical may interface with any service of that vertical.

When the second network entity 105-*b* requests AA for the first service 305 for the UE 115-*a* (e.g., requests Nnef Auth API), the second network entity 105-*b* may trigger AA (e.g., the Naf_Auth API) with the target address for the service identifier, service name, target address, vertical, or target service. For instance, during registration, the second network entity 105-*b* may be configured with the target addresses for specific services. So, the second network entity 105-*b* may determine the target address (e.g., of the fourth network entity 105-*d*) for the first service 305 after receiving the request 330 (e.g., after determining to trigger Naf Auth API).

Figure 4:
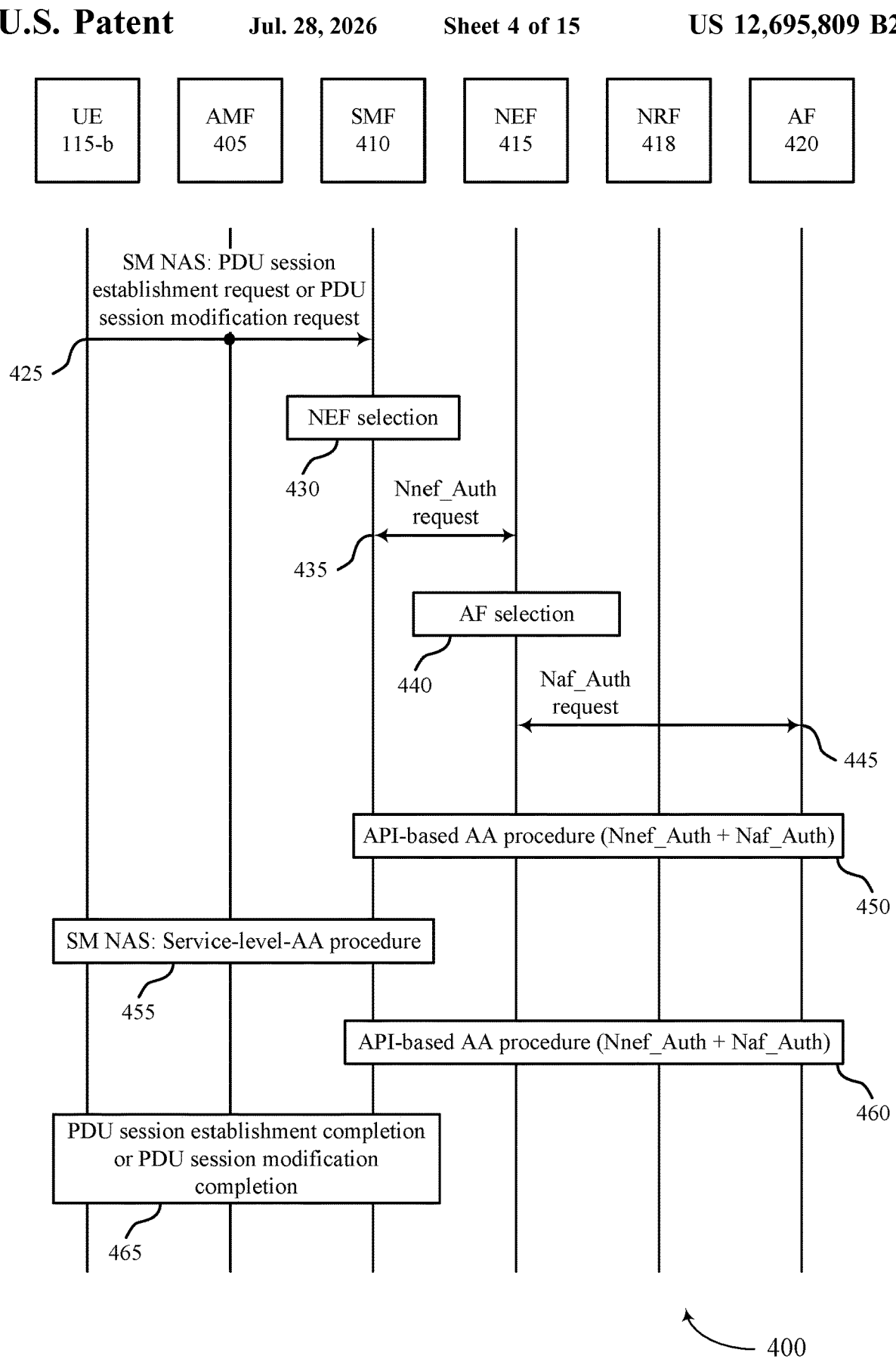
FIG. 4 illustrates an example of a process flow that supports target services for AA in accordance with one or more aspects of the present disclosure.

FIG. 4 illustrates an example of a process flow 400 that supports target services for AA in accordance with one or more aspects of the present disclosure. The process flow 400 includes a UE 115-*b*, an AMF 405, an SMF 410, an NEF 415, and an AF 420, which may be examples of the corresponding devices in accordance with aspects of the present disclosure. The SMF 410 may be an example of a first network entity 105, the NEF 415 may be an example of a second network entity 105, an NRF 418 may be an example of a third network entity 105, and the AF 420 may be an example of a fourth network entity 105. The process flow 400 may implement aspects of the wireless communications system 100, the network architecture 200, or the wireless communications system 300. For instance, the process flow 400 may support efficient techniques to facilitate AA for various services.

In the following description of the process flow 400, the signaling exchanged between the UE 115-*b*, the AMF 405, the SMF 410, the NEF 415, the NRF 418 and the AF 420 may be exchanged in a different order than the example order shown, or the operations performed by the UE 115-*b*, the AMF 405, the SMF 410, the NEF 415, the NRF 418 and the AF 420 may be performed in different orders or at different times. Some operations may also be omitted from the process flow 400, and other operations may be added to the process flow 400.

At 425, the UE 115-*a* may output, to the AMF 405 or the SMF 410, an SM NAS protocol data unit (PDU) establishment request or PDU session modification request. The SM NAS PDU establishment request or PDU session modification request may include a container that requests AA for a first service for the UE 115-*b*. The container may include a payload for an AA procedure. The container may include an indicator of the first service of a set of multiple services. The SMF 410 may obtain the container requesting AA for the first service from the UE 115-*b*.

At 430, the SMF 410 may perform NEF selection and may select the NEF 415 based on the NEF 415 supporting AA for the first service. For instance, the SMF 410 may output or obtain, based on the indicator of the first service in the container, a query message with an NRF 418 to discover the NEF 415 supporting AA for the first service. In some examples, the SMF 410 may verify, based on the indicator of the first service, that a subscription of the UE 115-*b* supports the first service. At 435, the SMF 410 may output or obtain one or more messages with the NEF 415 to authenticate and authorize the UE 115-*b* for the first service based on the indicator of the first service. For instance, the SMF 410 may output an Nnef_Auth request to the NEF 415 to authenticate and authorize the UE 115-*b* for the first service based on the indicator of the first service.

In some examples, the indicator of the first service is a service-level device identifier, and the SMF 410 may output or obtain the one or more messages based on a service identifier corresponding to the service-level device identifier. For instance, the SMF 410 may output a request for AA for the first service, and the SMF 410 may include the service identifier in the request. In some examples, the SMF 410 may select the NEF 415 based on the service identifier. In some examples, the SMF 410 may output, to the NEF 415, an indication of the service identifier or an indication of a target address associated with the service identifier (e.g., in a request). In some examples, the SMF 410 may verify a subscription of the UE 115-*b* to determine the service identifier corresponding to the service-level device identifier.

In some examples, the indicator of the first service is a service-level device identifier, and the SMF 410 may output or obtain the one or more messages based on a service name corresponding to the service-level device identifier. For instance, the SMF 410 may output a request for AA for the first service, and the SMF 410 may include the service name in the request. In some examples, the SMF 410 may select the NEF 415 based on the service name. In some examples, the SMF 410 may output, to the NEF 415, an indication of the service name or an indication of a target address associated with the service name (e.g., in a request). In some examples, the service name corresponding to the service-level device identifier is based on a format of the service-level device identifier.

In some examples, the indicator of the first service is a payload type of a payload in the container, and the SMF 410 may output or obtain the one or more messages based on a service name corresponding to the payload type. For instance, the SMF 410 may output a request for AA for the first service, and the SMF 410 may include the service name in the request. In some examples, the SMF 410 may select the NEF 415 based on the service name. In some examples, the SMF 410 may output, to the NEF 415, an indication of the service name or an indication of a target address associated with the service name (e.g., in a request). In some examples, the service name corresponding to the payload type may be based on a mapping of the payload type to the service name in accordance with a service-level agreement between an operator (e.g., an MNO) and a service provider (e.g., an ASP).

In some examples, the indicator of the first service is a server address in the container, and the SMF 410 may output, to the NEF 415, an indication of the server address (e.g., a target address). For instance, the SMF 410 may output a request for AA for the first service, and the SMF 410 may include the server address in the request. In some examples, the SMF 410 may select the NEF 415 based on the server address. In some examples, the SMF 410 may output, to the NEF 415, an indication of the server address (e.g., in a request). If the SMF 410 fails to receive the server address in the container from the UE 115-*b*, the network may fail to connect to the AF 420. As such, the network (e.g., the SMF 410 or the NEF 415) may set a failure cause to 'wrong target server,' and the network may transmit an error message to the UE 115-*b* indicating the failure cause. The UE 115-*b* may then transmit a subsequent container to the SMF 410 to request AA for the first service, and the UE 115-*b* may include a server address in the subsequent container.

In some examples, the indicator of the first service is a payload type of a payload in the container, and the SMF 410 may output or obtain the one or more messages based on a category of services (e.g., a vertical) corresponding to the payload type. The container may also include a server address for the first service. In some examples, the SMF 410 may output a request for AA for the first service, and the SMF 410 may include the category of services, the server address, or both in the request. The category of services may include the first service, and the SMF 410 may select the NEF 415 based on the category of services. In some examples, the SMF 410 may output, to the NEF 415, an indication of the server address for the first service (e.g., in a request).

The NEF 415 may obtain, from the SMF 410 (e.g., at 435), a request to authenticate and authorize the UE 115-*b* for the first service. The request may include an indicator of the first service of a set of multiple services. The indicator of the first service in the request may be a service identifier, a service name, a server address, or a combination thereof.

At 440, the NEF 415 may perform AF selection and may select the AF 420 based on the AF 420 supporting AA for the first service. For instance, the NEF 415 may register to an NRF 418 and may discover the AF 420 supporting AA for the first service during registration. As part of registering to the NRF 418, the NEF 415 may output, to the NRF 418, an indication that the NEF 415 supports the first service, and the NEF 415 may obtain, from the NRF 418, an indication of a target address for the AF 420 supporting the first service (e.g., the AF 420 corresponding to the indicator of the first service). The NEF 415 may select the AF 420 based on obtaining the indication of the target address of the AF 420 (e.g., for the first service). In some examples, the NEF 415 may output, to the NRF 418, an indication of a range of domain names corresponding to the first service supported by the NEF 415. In some examples, the NEF 415 may output, to the NRF 418, an indication of a category of services supported by the NEF 415, the category of services including the first service.

At 445, the NEF 415 may output or obtain one or more messages with the AF 420 to authenticate and authorize the UE 115-*b* for the first service based on the indicator of the first service. For instance, the NEF 415 may output an Naf_Auth request to the AF 420 to authenticate and authorize the UE 115-*b* for the first service based on the indicator of the first service.

At 450, the SMF 410, the NEF 415, and the AF 420 may exchange signaling (e.g., output or obtain one or more messages) as part of an API-based AA procedure (e.g., Nnef_Auth and Naf_Auth) to authenticate and authorize the UE 115-*b* for the first service.

At 455, the UE 115-*b*, the AMF 405, and the SMF 410 may exchange signaling (e.g., output or obtain one or more messages) as part of an SM NAS service-level-AA procedure to authenticate and authorize the UE 115-*b* for the first service.

At 460, the SMF 410, the NEF 415, and the AF 420 may exchange further signaling (e.g., output or obtain one or more messages) as part of an API-based AA procedure (e.g., Nnef_Auth and Naf_Auth) to authenticate and authorize the UE 115-*b* for the first service.

At 465, the UE 115-*b*, the AMF 405, and the SMF 410 may exchange signaling (e.g., output or obtain one or more messages) for PDU session establishment completion or PDU session modification completion.

Figure 5:
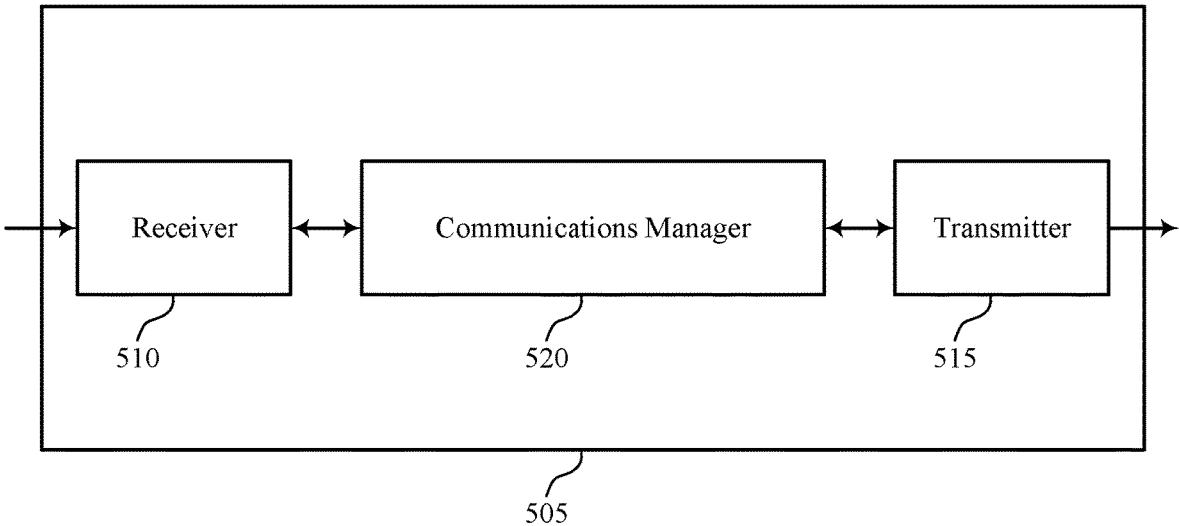
FIGS. 5 and 6 show block diagrams of devices that support target services for AA in accordance with one or more aspects of the present disclosure.

FIG. 5 shows a block diagram 500 of a device 505 that supports target services for AA in accordance with one or more aspects of the present disclosure. The device 505 may be an example of aspects of a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, PDUs, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, PDUs, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of target services for AA as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first network entity in accordance with examples as disclosed herein. For example, the communications manager 520 may be configured as or otherwise support a means for obtaining a container that requests validation for a first service for a UE, the container including an indicator of the first service of a set of multiple services. The communications manager 520 may be configured as or otherwise support a means for outputting or obtaining one or more messages with a second network entity to validate the UE for the first service based on the indicator of the first service, the second network entity selected based on the second network entity supporting validation for the first service.

Additionally, or alternatively, the communications manager 520 may support wireless communication at a second network entity in accordance with examples as disclosed herein. For example, the communications manager 520 may be configured as or otherwise support a means for obtaining, from a first network entity, a request to validate a UE for a first service, the request including an indicator of the first service of a set of multiple services. The communications manager 520 may be configured as or otherwise support a means for outputting or obtaining one or more messages with a fourth network entity to validate the UE for the first service based on the indicator of the first service, the fourth network entity selected based on the fourth network entity supporting validation for the first service.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, and more efficient utilization of communication resources. For instance, the described techniques may support AA for various services without excessive signaling and with a few changes to existing procedures, resulting in the reduced processing, reduced power consumption, and more efficient utilization of communication resources.

Figure 6:
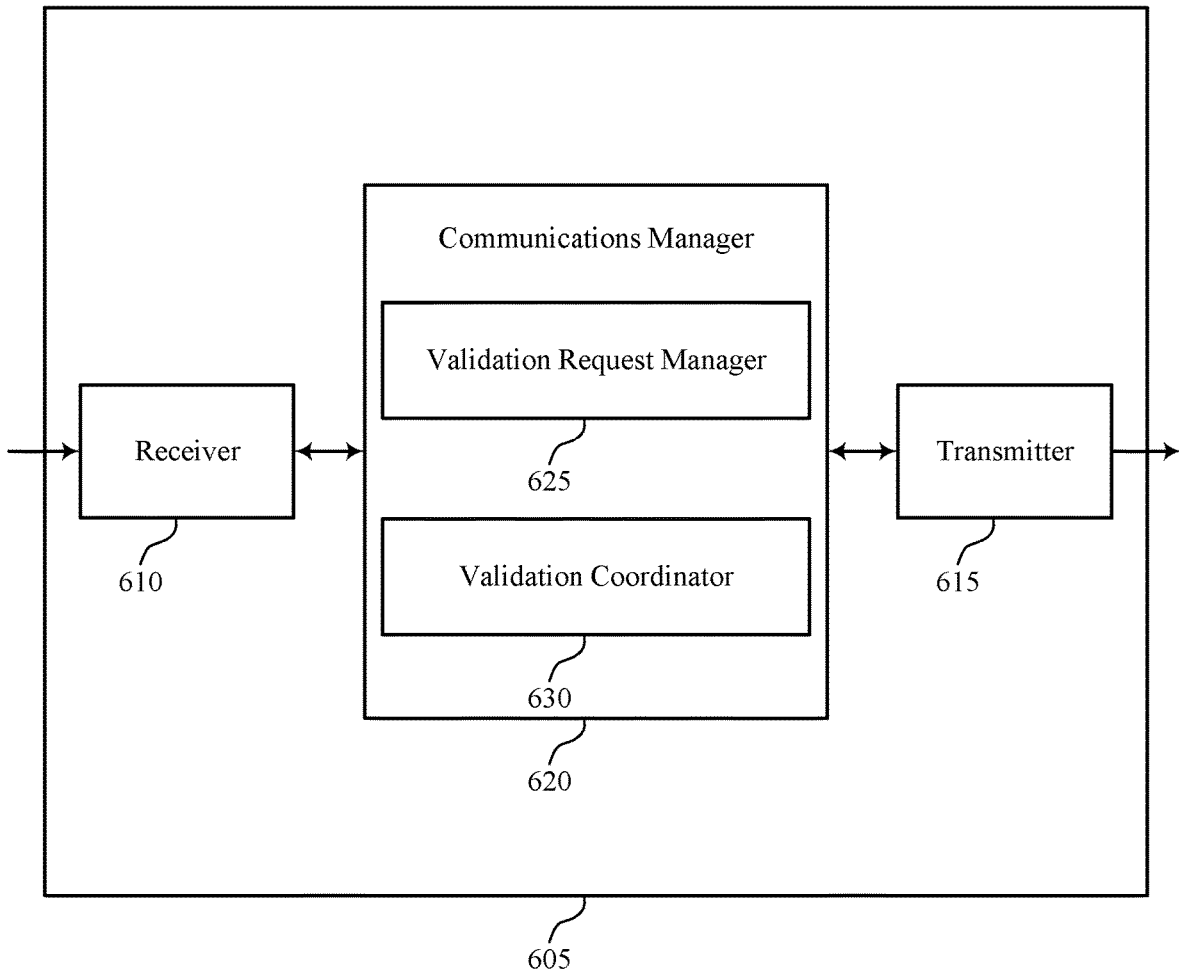

FIG. 6 shows a block diagram 600 of a device 605 that supports target services for AA in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, PDUs, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, PDUs, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of target services for AA as described herein. For example, the communications manager 620 may include an validation request manager 625 an validation coordinator 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first network entity in accordance with examples as disclosed herein. The validation request manager 625 may be configured as or otherwise support a means for obtaining a container that requests validation for a first service for a UE, the container including an indicator of the first service of a set of multiple services. The validation coordinator 630 may be configured as or otherwise support a means for outputting or obtaining one or more messages with a second network entity to validate the UE for the first service based on the indicator of the first service, the second network entity selected based on the second network entity supporting validation for the first service.

Additionally, or alternatively, the communications manager 620 may support wireless communication at a second network entity in accordance with examples as disclosed herein. The validation request manager 625 may be configured as or otherwise support a means for obtaining, from a first network entity, a request to validate a UE for a first service, the request including an indicator of the first service of a set of multiple services. The validation coordinator 630 may be configured as or otherwise support a means for outputting or obtaining one or more messages with a fourth network entity to validate the UE for the first service based on the indicator of the first service, the fourth network entity selected based on the fourth network entity supporting validation for the first service.

Figure 7:
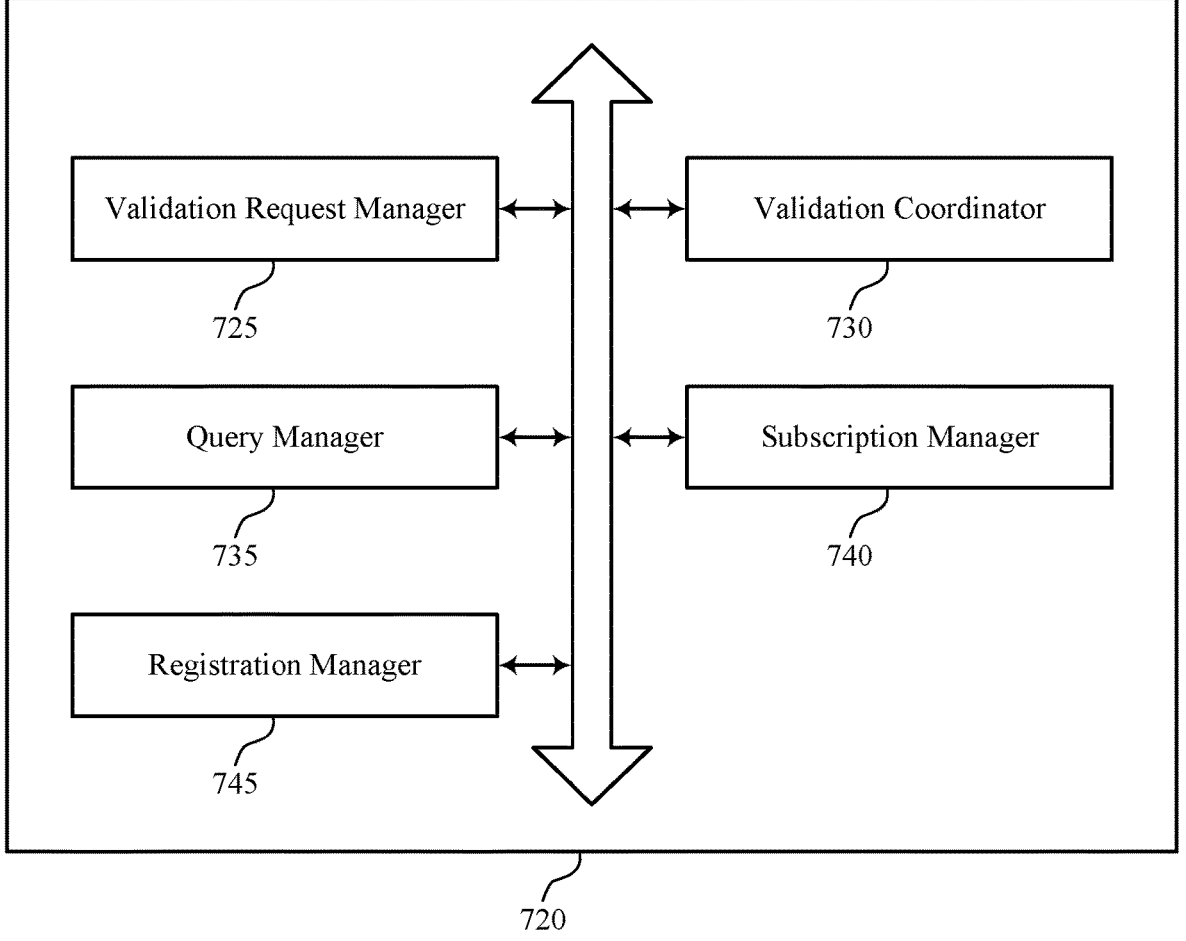
FIG. 7 shows a block diagram of a communications manager that supports target services for AA in accordance with one or more aspects of the present disclosure.

FIG. 7 shows a block diagram 700 of a communications manager 720 that supports target services for AA in accordance with one or more aspects of the present disclosure. The communications manager 720 may be an example of aspects of a communications manager 520, a communications manager 620, or both, as described herein. The communications manager 720, or various components thereof, may be an example of means for performing various aspects of target services for AA as described herein. For example, the communications manager 720 may include an validation request manager 725, an validation coordinator 730, a query manager 735, a subscription manager 740, a registration manager 745, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communication at a first network entity in accordance with examples as disclosed herein. The validation request manager 725 may be configured as or otherwise support a means for obtaining a container that requests validation for a first service for a UE, the container including an indicator of the first service of a set of multiple services. The validation coordinator 730 may be configured as or otherwise support a means for outputting or obtaining one or more messages with a second network entity to validate the UE for the first service based on the indicator of the first service, the second network entity selected based on the second network entity supporting validation for the first service.

In some examples, the query manager 735 may be configured as or otherwise support a means for outputting or obtaining, based on the indicator of the first service, a query message with a third network entity to discover the second network entity supporting validation for the first service.

In some examples, the indicator of the first service includes a service-level device identifier, and the validation coordinator 730 may be configured as or otherwise support a means for outputting or obtaining the one or more messages based on a service identifier corresponding to the service-level device identifier, the second network entity selected based on the service identifier.

In some examples, the validation coordinator 730 may be configured as or otherwise support a means for outputting, to the second network entity, an indication of the service identifier or an indication of a target address associated with the service identifier.

In some examples, the subscription manager 740 may be configured as or otherwise support a means for verifying a subscription of the UE to determine the service identifier corresponding to the service-level device identifier. For example, the subscription may include the service identifier indicating a capability of the UE to support the plurality of services.

In some examples, the indicator of the first service includes a service-level device identifier, and the validation coordinator 730 may be configured as or otherwise support a means for outputting or obtaining the one or more messages based on a service name corresponding to the service-level device identifier, the second network entity selected based on the service name.

In some examples, the validation coordinator 730 may be configured as or otherwise support a means for outputting, to the second network entity, an indication of the service name or an indication of a target address associated with the service name.

In some examples, the service name corresponding to the service-level device identifier is based on a format of the service-level device identifier.

In some examples, the indicator of the first service includes a payload type of a payload in the container, the validation coordinator 730 may be configured as or otherwise support a means for outputting or obtaining the one or more messages based on a service name corresponding to the payload type, the second network entity selected based on the service name.

In some examples, the validation coordinator 730 may be configured as or otherwise support a means for outputting, to the second network entity, an indication of the service name or an indication of a target address associated with the service name.

In some examples, the service name corresponding to the payload type is based on a mapping of the payload type to the service name in accordance with a service-level agreement between an operator and a service provider.

In some examples, the indicator of the first service includes a server address in the container, and the validation coordinator 730 may be configured as or otherwise support a means for outputting, to the second network entity, an indication of the server address.

In some examples, the indicator of the first service includes a payload type of a payload in the container, the validation coordinator 730 may be configured as or otherwise support a means for outputting or obtaining the one or more messages based on a category of services corresponding to the payload type, the category of services including the first service, the second network entity selected based on the category of services.

In some examples, the container further includes a server address for the first service, and the validation coordinator 730 may be configured as or otherwise support a means for outputting, to the second network entity, an indication of the server address for the first service.

In some examples, the subscription manager 740 may be configured as or otherwise support a means for verifying, based on the indicator of the first service, that a subscription of the UE supports the first service.

In some examples, the container includes a payload for a validation procedure.

Additionally, or alternatively, the communications manager 720 may support wireless communication at a second network entity in accordance with examples as disclosed herein. In some examples, the validation request manager 725 may be configured as or otherwise support a means for obtaining, from a first network entity, a request to validate a UE for a first service, the request including an indicator of the first service of a set of multiple services. In some examples, the validation coordinator 730 may be configured as or otherwise support a means for outputting or obtaining one or more messages with a fourth network entity to validate the UE for the first service based on the indicator of the first service, the fourth network entity selected based on the fourth network entity supporting validation for the first service.

In some examples, the registration manager 745 may be configured as or otherwise support a means for outputting, to a third network entity, an indication that the second network entity supports the first service. In some examples, the registration manager 745 may be configured as or otherwise support a means for obtaining, from the third network entity, an indication of a target address of the fourth network entity corresponding to the indicator of the first service, the fourth network entity selected based on obtaining the indication of the target address of the fourth network entity.

In some examples, to support outputting the indication that the second network entity supports the first service, the registration manager 745 may be configured as or otherwise support a means for outputting, to the third network entity, an indication of a range of domain names corresponding to the first service supported by the second network entity.

In some examples, to support outputting the indication that the second network entity supports the first service, the registration manager 745 may be configured as or otherwise support a means for outputting, to the third network entity, an indication of a category of services supported by the second network entity, the category of services including the first service.

In some examples, the indicator of the first service includes a service identifier, a service name, a server address, or a combination thereof.

Figure 8:
FIG. 8 shows a diagram of a system including a device that supports target services for AA in accordance with one or more aspects of the present disclosure.

FIG. 8 shows a diagram of a system 800 including a device 805 that supports target services for AA in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or memory components (for example, the processor 835, or the memory 825, or both), may be included in a chip or chip assembly that is installed in the device 805. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting target services for AA). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805. The processor 835 may be any one or more suitable processors capable of executing scripts or instructions of one or more software programs stored in the device 805 (such as within the memory 825). In some implementations, the processor 835 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 835, or the transceiver 810, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system. A person having ordinary skill in the art will readily recognize that a first interface also may obtain information or signal inputs, and a second interface also may output information or signal outputs.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communication at a first network entity in accordance with examples as disclosed herein. For example, the communications manager 820 may be configured as or otherwise support a means for obtaining a container that requests validation for a first service for a UE, the container including an indicator of the first service of a set of multiple services. The communications manager 820 may be configured as or otherwise support a means for outputting or obtaining one or more messages with a second network entity to validate the UE for the first service based on the indicator of the first service, the second network entity selected based on the second network entity supporting validation for the first service.

Additionally, or alternatively, the communications manager 820 may support wireless communication at a second network entity in accordance with examples as disclosed herein. For example, the communications manager 820 may be configured as or otherwise support a means for obtaining, from a first network entity, a request to validate a UE for a first service, the request including an indicator of the first service of a set of multiple services. The communications manager 820 may be configured as or otherwise support a means for outputting or obtaining one or more messages with a fourth network entity to validate the UE for the first service based on the indicator of the first service, the fourth network entity selected based on the fourth network entity supporting validation for the first service.

By including or configuring the communications manager 820 in accordance with examples as described herein, the device 805 may support techniques for reduced processing, reduced power consumption, and more efficient utilization of communication resources. For instance, the described techniques may support validation for various services without excessive signaling and with a few changes to existing procedures, resulting in the reduced processing, reduced power consumption, and more efficient utilization of communication resources.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, the processor 835, the memory 825, the code 830, or any combination thereof. For example, the code 830 may include instructions executable by the processor 835 to cause the device 805 to perform various aspects of target services for AA as described herein, or the processor 835 and the memory 825 may be otherwise configured to perform or support such operations.

Figure 9:
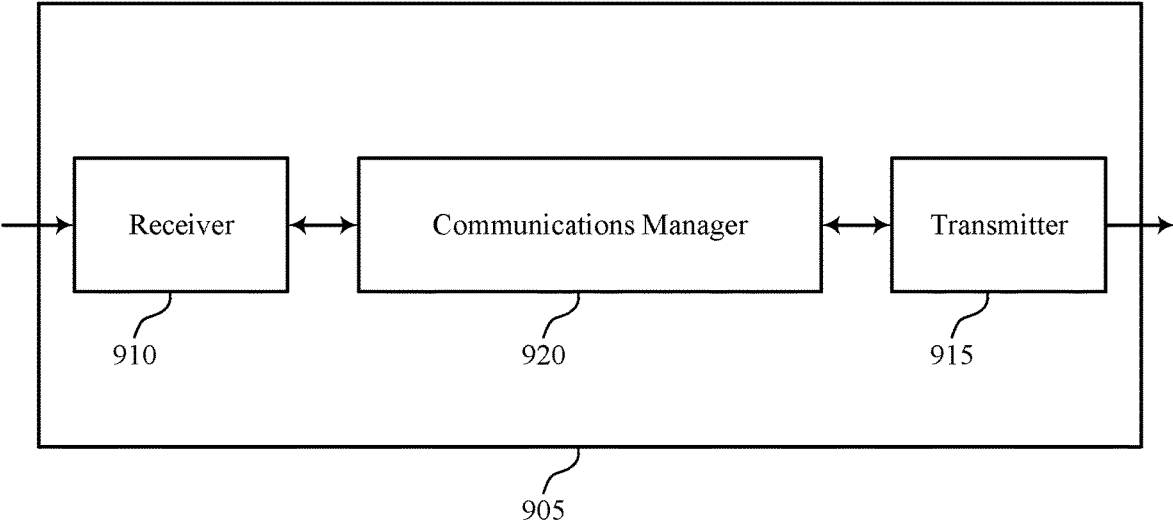
FIGS. 9 and 10 show block diagrams of devices that support target services for AA in accordance with one or more aspects of the present disclosure.

FIG. 9 shows a block diagram 900 of a device 905 that supports target services for AA in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to target services for AA). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to target services for AA). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of target services for AA as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for outputting, to a first network entity, a container that requests validation for a first service for the UE, the container including an indicator of the first service of a set of multiple services. The communications manager 920 may be configured as or otherwise support a means for outputting or obtaining one or more messages with the first network entity to validate the UE for the first service based on transmitting the container.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources. For instance, the described techniques may support AA for various services without excessive signaling and with a few changes to existing procedures, resulting in the reduced processing, reduced power consumption, and more efficient utilization of communication resources.

Figure 10:
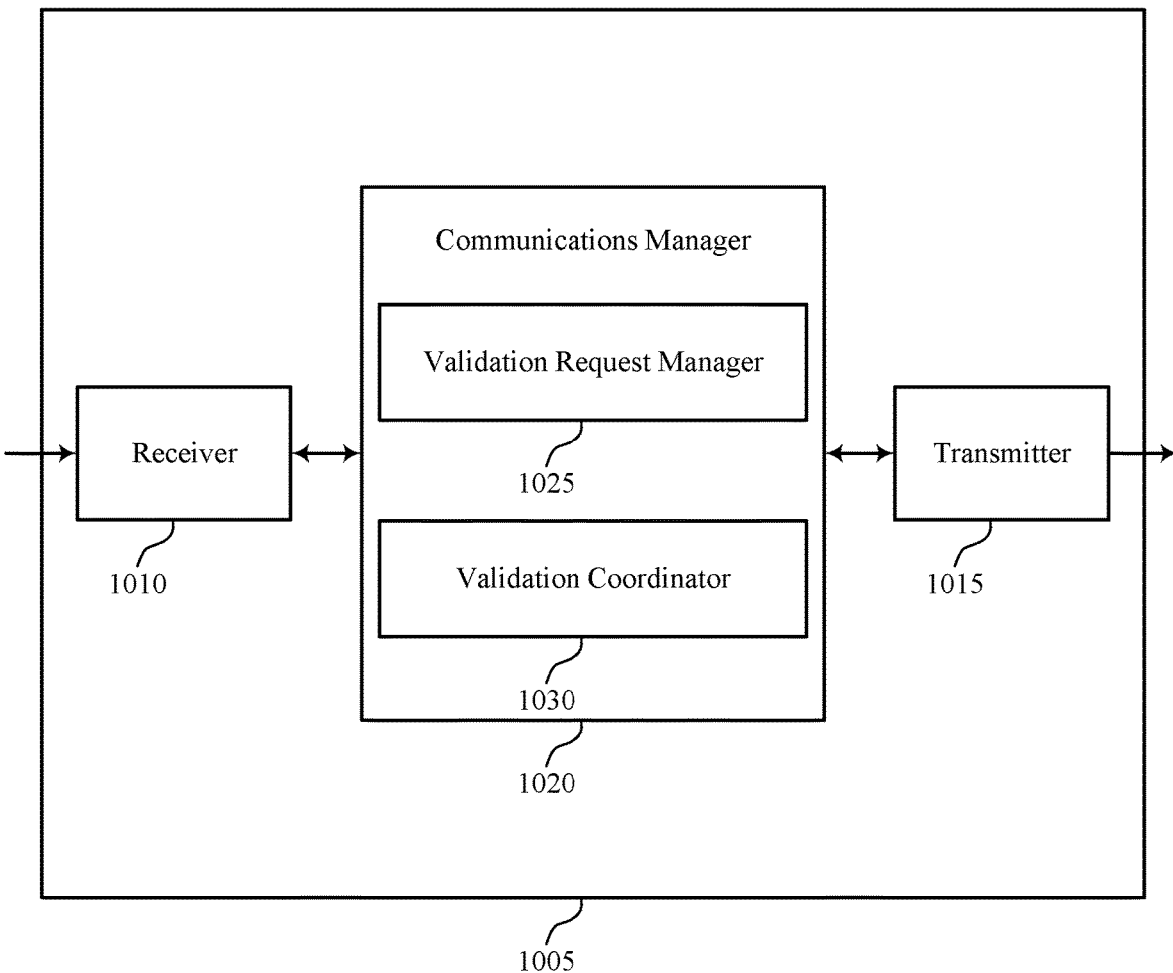

FIG. 10 shows a block diagram 1000 of a device 1005 that supports target services for AA in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to target services for AA). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to target services for AA). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of target services for AA as described herein. For example, the communications manager 1020 may include an validation request manager 1025 an validation coordinator 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The validation request manager 1025 may be configured as or otherwise support a means for outputting, to a first network entity, a container that requests validation for a first service for the UE, the container including an indicator of the first service of a set of multiple services. The validation coordinator 1030 may be configured as or otherwise support a means for outputting or obtaining one or more messages with the first network entity to validate the UE for the first service based on transmitting the container.

FIG. 11 shows a block diagram 1100 of a communications manager 1120 that supports target services for AA in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of target services for AA as described herein. For example, the communications manager 1120 may include an validation request manager 1125 an validation coordinator 1130, or any combination thereof. Each of these components may communicate, directly or indirectly, with one another (e.g., via one or more buses).

The communications manager 1120 may support wireless communication at a UE in accordance with examples as disclosed herein. The validation request manager 1125 may be configured as or otherwise support a means for outputting, to a first network entity, a container that requests validation for a first service for the UE, the container including an indicator of the first service of a set of multiple services. The validation coordinator 1130 may be configured as or otherwise support a means for outputting or obtaining one or more messages with the first network entity to validate the UE for the first service based on transmitting the container.

In some examples, the indicator of the first service includes a service-level device identifier, the service-level device identifier corresponding to a service identifier or a service name of the first service.

In some examples, the indicator of the first service includes a payload type of a payload in the container, the payload type corresponding to a service name of the first service.

In some examples, the indicator of the first service includes a server address.

In some examples, the indicator of the first service includes a payload type of a payload in the container, the payload type corresponding to a category of services including the first service. In some examples, the container further includes a server address for the first service.

Figure 12:
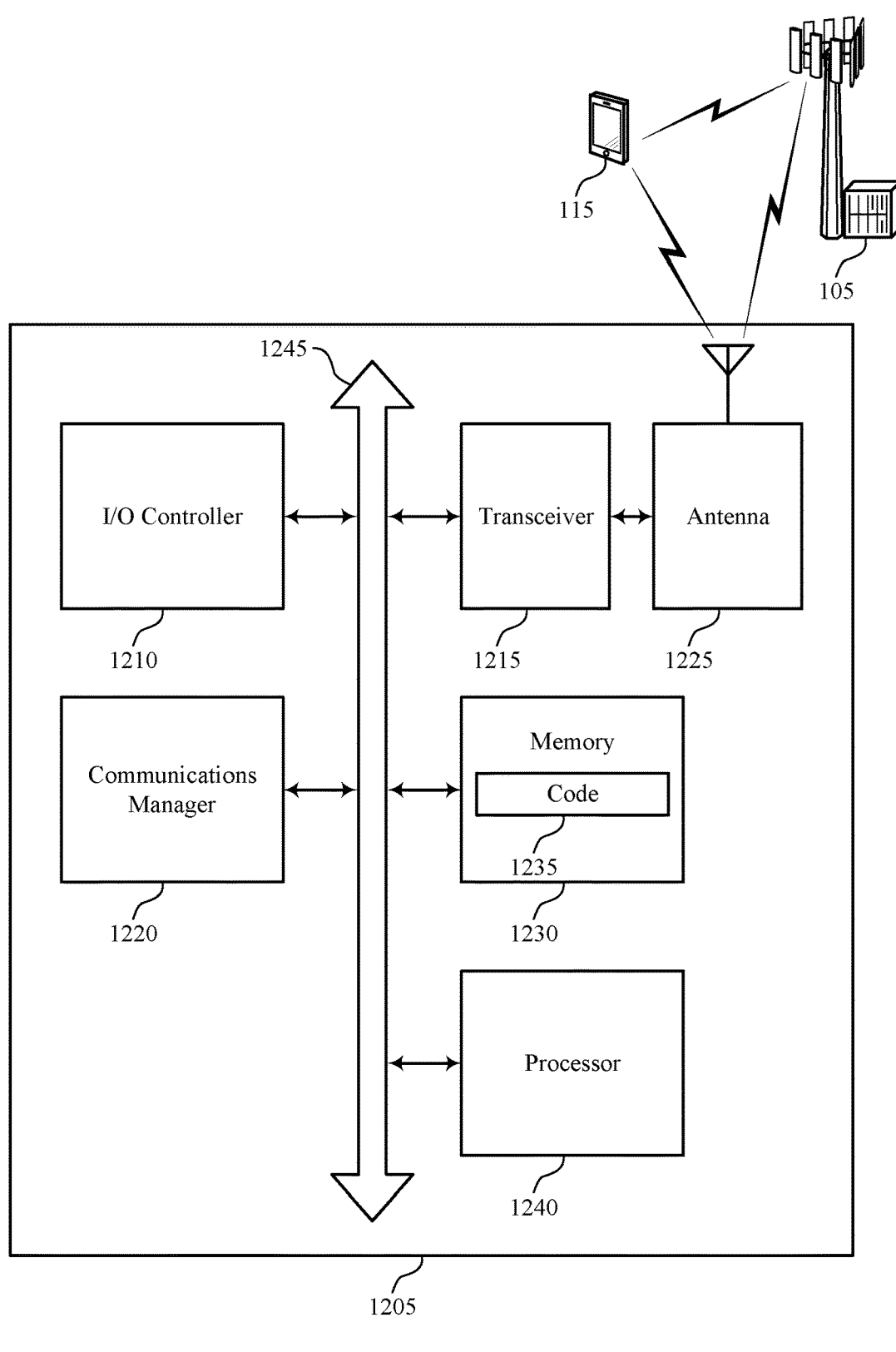
FIG. 12 shows a diagram of a system including a device that supports target services for AA in accordance with one or more aspects of the present disclosure.

FIG. 12 shows a diagram of a system 1200 including a device 1205 that supports target services for AA in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225.

The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting target services for AA). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for outputting, to a first network entity, a container that requests validation for a first service for the UE, the container including an indicator of the first service of a set of multiple services. The communications manager 1220 may be configured as or otherwise support a means for outputting or obtaining one or more messages with the first network entity to validate the UE for the first service based on transmitting the container.

By including or configuring the communications manager 1220 in accordance with examples as described herein, the device 1205 may support techniques for reduced processing, reduced power consumption, and more efficient utilization of communication resources. For instance, the described techniques may support AA for various services without excessive signaling and with a few changes to existing procedures, resulting in the reduced processing, reduced power consumption, and more efficient utilization of communication resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager

1220 may be supported by or performed by the processor 1240, the memory 1230, the code 1235, or any combination thereof. For example, the code 1235 may include instructions executable by the processor 1240 to cause the device 1205 to perform various aspects of target services for AA as described herein, or the processor 1240 and the memory 1230 may be otherwise configured to perform or support such operations.

FIG. 13 shows a flowchart illustrating a method 1300 that supports target services for AA in accordance with one or more aspects of the present disclosure. The operations of the method 1300 may be implemented by a network entity or its components as described herein. For example, the operations of the method 1300 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1305, the method may include obtaining a container that requests validation for a first service for a UE, the container including an indicator of the first service of a set of multiple services. The operations of 1305 may be performed in accordance with examples as disclosed herein. In some examples, aspects of the operations of 1305 may be performed by an validation request manager 725 as described with reference to FIG. 7.

At 1310, the method may include outputting or obtaining one or more messages with a second network entity to validate the UE for the first service based on the indicator of the first service, the second network entity selected based on the second network entity supporting validation for the first service. The operations of 1310 may be performed in accordance with examples as disclosed herein. In some examples, aspects of the operations of 1310 may be performed by an validation coordinator 730 as described with reference to FIG. 7.

FIG. 14 shows a flowchart illustrating a method 1400 that supports target services for AA in accordance with one or more aspects of the present disclosure. The operations of the method 1400 may be implemented by a network entity or its components as described herein. For example, the operations of the method 1400 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1405, the method may include obtaining, from a first network entity, a request to validate a UE for a first service, the request including an indicator of the first service of a set of multiple services. The operations of 1405 may be performed in accordance with examples as disclosed herein. In some examples, aspects of the operations of 1405 may be performed by an validation request manager 725 as described with reference to FIG. 7.

At 1410, the method may include outputting or obtaining one or more messages with a fourth network entity to validate the UE for the first service based on the indicator of the first service, the fourth network entity selected based on the fourth network entity supporting validation for the first service. The operations of 1410 may be performed in accordance with examples as disclosed herein. In some examples, aspects of the operations of 1410 may be performed by an validation coordinator 730 as described with reference to FIG. 7.

Figure 15:
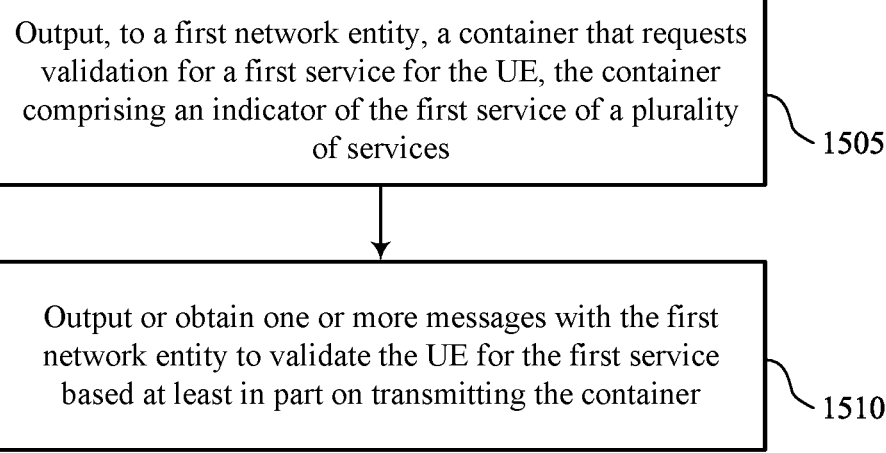

FIG. 15 shows a flowchart illustrating a method 1500 that supports target services for AA in accordance with one or more aspects of the present disclosure. The operations of the method 1500 may be implemented by a UE or its components as described herein. For example, the operations of the method 1500 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1505, the method may include outputting, to a first network entity, a container that requests validation for a first service for the UE, the container including an indicator of the first service of a set of multiple services. The operations of 1505 may be performed in accordance with examples as disclosed herein. In some examples, aspects of the operations of 1505 may be performed by an validation request manager 1125 as described with reference to FIG. 11.

At 1510, the method may include outputting or obtaining one or more messages with the first network entity to validate the UE for the first service based on transmitting the container. The operations of 1510 may be performed in accordance with examples as disclosed herein. In some examples, aspects of the operations of 1510 may be performed by an validation coordinator 1130 as described with reference to FIG. 11.

The following provides an overview of aspects of the present disclosure:

Aspect 1: A method for wireless communication at a first network entity, comprising: obtaining a container that requests validation for a first service for a UE, the container comprising an indicator of the first service of a plurality of services; and outputting or obtaining one or more messages with a second network entity to validate the UE for the first service based at least in part on the indicator of the first service, the second network entity selected based at least in part on the second network entity supporting validation for the first service.

Aspect 2: The method of aspect 1, further comprising: outputting or obtaining, based at least in part on the indicator of the first service, a query message with a third network entity to discover the second network entity supporting validation for the first service.

Aspect 3: The method of any of aspects 1 through 2, wherein the indicator of the first service comprises a service-level device identifier, the outputting or obtaining the one or more messages further comprising: outputting or obtaining the one or more messages based at least in part on a service identifier corresponding to the service-level device identifier, the second network entity selected based at least in part on the service identifier.

Aspect 4: The method of aspect 3, further comprising: outputting, to the second network entity, an indication of the service identifier or an indication of a target address associated with the service identifier.

Aspect 5: The method of any of aspects 3 through 4, further comprising: verifying a subscription of the UE to determine the service identifier corresponding to the service-level device identifier.

Aspect 6: The method of aspect 5, wherein the subscription comprises the service identifier indicating a capability of the UE to support the plurality of services.

Aspect 7: The method of any of aspects 1 through 6, wherein the indicator of the first service comprises a service-level device identifier, the outputting or obtaining the one or more messages further comprising: outputting or obtaining the one or more messages based at least in part on a service name corresponding to the service-level device identifier, the second network entity selected based at least in part on the service name.

Aspect 8: The method of aspect 7, further comprising: outputting, to the second network entity, an indication of the service name or an indication of a target address associated with the service name.

Aspect 9: The method of any of aspects 7 through 8, wherein the service name corresponding to the service-level device identifier is based at least in part on a format of the service-level device identifier.

Aspect 10: The method of any of aspects 1 through 9, wherein the indicator of the first service comprises a payload type of a payload in the container, the outputting or obtaining the one or more messages further comprising: outputting or obtaining the one or more messages based at least in part on a service name corresponding to the payload type, the second network entity selected based at least in part on the service name.

Aspect 11: The method of aspect 10, further comprising: outputting, to the second network entity, an indication of the service name or an indication of a target address associated with the service name.

Aspect 12: The method of any of aspects 10 through 11, wherein the service name corresponding to the payload type is based at least in part on a mapping of the payload type to the service name in accordance with a service-level agreement between an operator and a service provider.

Aspect 13: The method of any of aspects 1 through 12, wherein the indicator of the first service comprises a server address in the container, the method further comprising: outputting, to the second network entity, an indication of the server address.

Aspect 14: The method of any of aspects 1 through 13, wherein the indicator of the first service comprises a payload type of a payload in the container, the outputting or obtaining the one or more messages further comprising: outputting or obtaining the one or more messages based at least in part on a category of services corresponding to the payload type, the category of services comprising the first service, the second network entity selected based at least in part on the category of services.

Aspect 15: The method of aspect 14, wherein the container further comprises a server address for the first service, the method further comprising: outputting, to the second network entity, an indication of the server address for the first service.

Aspect 16: The method of any of aspects 1 through 15, further comprising: verifying, based at least in part on the indicator of the first service, that a subscription of the UE supports the first service.

Aspect 17: The method of any of aspects 1 through 16, wherein the container comprises a payload for a validation procedure.

Aspect 18: A method for wireless communication at a second network entity, comprising: obtaining, from a first network entity, a request to validate a UE for a first service, the request comprising an indicator of the first service of a plurality of services; and outputting or obtaining one or more messages with a fourth network entity to validate the UE for the first service based at least in part on the indicator of the first service, the fourth network entity selected based at least in part on the fourth network entity supporting validation for the first service.

Aspect 19: The method of aspect 18, further comprising: outputting, to a third network entity, an indication that the second network entity supports the first service; and obtaining, from the third network entity, an indication of a target address of the fourth network entity corresponding to the indicator of the first service, the fourth network entity selected based at least in part on obtaining the indication of the target address of the fourth network entity.

Aspect 20: The method of aspect 19, wherein outputting the indication that the second network entity supports the first service comprises: outputting, to the third network entity, an indication of a range of domain names corresponding to the first service supported by the second network entity.

Aspect 21: The method of any of aspects 19 through 20, wherein outputting the indication that the second network entity supports the first service comprises: outputting, to the third network entity, an indication of a category of services supported by the second network entity, the category of services comprising the first service.

Aspect 22: The method of any of aspects 18 through 21, wherein the indicator of the first service comprises a service identifier, a service name, a server address, or a combination thereof.

Aspect 23: A method for wireless communication at a UE, comprising: outputting, to a first network entity, a container that requests validation for a first service for the UE, the container comprising an indicator of the first service of a plurality of services; and outputting or obtaining one or more messages with the first network entity to validate the UE for the first service based at least in part on transmitting the container.

Aspect 24: The method of aspect 23, wherein the indicator of the first service comprises a service-level device identifier, the service-level device identifier corresponding to a service identifier or a service name of the first service.

Aspect 25: The method of any of aspects 23 through 24, wherein the indicator of the first service comprises a payload type of a payload in the container, the payload type corresponding to a service name of the first service.

Aspect 26: The method of any of aspects 23 through 25, wherein the indicator of the first service comprises a server address.

Aspect 27: The method of any of aspects 23 through 26, wherein the indicator of the first service comprises a payload type of a payload in the container, the payload type corresponding to a category of services comprising the first service, and the container further comprises a server address for the first service.

Aspect 28: An apparatus for wireless communication at a first network entity, comprising one or more processors and one or more memories coupled with the one or more processors, the one or more processors coupled with the one or more memories and individually or collectively configured to cause the first network entity to perform a method of any of aspects 1 through 17.

Aspect 29: An apparatus for wireless communication at a first network entity, comprising at least one means for performing a method of any of aspects 1 through 17.

Aspect 30: A non-transitory computer-readable medium storing code for wireless communication at a first network entity, the code comprising instructions executable by one or more processors to perform a method of any of aspects 1 through 17.

Aspect 31: An apparatus for wireless communication at a second network entity, comprising one or more processors and one or more memories coupled with the one or more processors, the one or more processors coupled with the one or more memories and individually or collectively configured to cause the second network entity to perform a method of any of aspects 18 through 22.

Aspect 32: An apparatus for wireless communication at a second network entity, comprising at least one means for performing a method of any of aspects 18 through 22.

Aspect 33: A non-transitory computer-readable medium storing code for wireless communication at a second network entity, the code comprising instructions executable by one or more processors to perform a method of any of aspects 18 through 22.

Aspect 34: An apparatus for wireless communication at a UE, comprising one or more processors and one or more memories coupled with the one or more processors, the one or more processors coupled with the one or more memories and individually or collectively configured to cause the UE to perform a method of any of aspects 23 through 27.

Aspect 35: An apparatus for wireless communication at a UE, comprising at least one means for performing a method of any of aspects 23 through 27.

Aspect 36: A non-transitory computer-readable medium storing code for wireless communication at a UE, the code comprising instructions executable by one or more processors to perform a method of any of aspects 23 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by one or more processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by one or more memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

52

What is claimed is:

1. An apparatus for wireless communication at a first network entity, comprising:
   one or more memories; and
   one or more processors coupled with the one or more memories and configured to cause the first network entity to:
      obtain a request to validate a first network service for a user equipment (UE), the request comprising an indicator of the first network service of a plurality of network services; and
      output or obtain one or more messages with a second network entity to validate the UE for the first network service based at least in part on the indicator of the first network service, the second network entity selected based at least in part on the indicator of the first network service and support, by the second network entity, of validation for the first network service.

2. The apparatus of claim 1, wherein the one or more processors are further configured to cause the first network entity to:
   output or obtain, based at least in part on the indicator of the first network service, a query message with a third network entity to discover the second network entity that supports validation for the first network service.

3. The apparatus of claim 1, wherein the indicator of the first network service comprises a service-level device identifier, and the one or more processors are further configured to cause the first network entity to:
   output or obtain the one or more messages based at least in part on a service identifier that corresponds to the service-level device identifier, the second network entity selected based at least in part on the service identifier.

4. The apparatus of claim 3, wherein the one or more processors are further configured to cause the first network entity to:
   output, to the second network entity, an indication of the service identifier or an indication of a target address associated with the service identifier.

5. The apparatus of claim 3, wherein the one or more processors are further configured to cause the first network entity to:
   verify a subscription of the UE to determine the service identifier that corresponds to the service-level device identifier.

6. The apparatus of claim 5, wherein the subscription comprises the service identifier that indicates a capability of the UE to support the plurality of network services.

7. The apparatus of claim 1, wherein the indicator of the first network service comprises a service-level device identifier, and the one or more processors are further configured to cause the first network entity to:
   output or obtain the one or more messages based at least in part on a service name that corresponds to the service-level device identifier, the second network entity selected based at least in part on the service name.

8. The apparatus of claim 7, wherein the one or more processors are further configured to cause the first network entity to:
   output, to the second network entity, an indication of the service name or an indication of a target address associated with the service name.

9. The apparatus of claim 7, wherein the service name that corresponds to the service-level device identifier is based at least in part on a format of the service-level device identifier.

10. The apparatus of claim 1, wherein the indicator of the first network service comprises a payload type of a payload in the request, and the one or more processors are further configured to cause the first network entity to:

output or obtain the one or more messages based at least in part on a service name that corresponds to the payload type, the second network entity selected based at least in part on the service name.

11. The apparatus of claim 10, wherein the one or more processors are further configured to cause the first network entity to:

output, to the second network entity, an indication of the service name or an indication of a target address associated with the service name.

12. The apparatus of claim 10, wherein the service name that corresponds to the payload type is based at least in part on a mapping of the payload type to the service name in accordance with a service-level agreement between an operator and a service provider.

13. The apparatus of claim 1, wherein the indicator of the first network service comprises a server address in the request, and the one or more processors are further configured to cause the first network entity to:

output, to the second network entity, an indication of the server address.

14. The apparatus of claim 1, wherein the indicator of the first network service comprises a payload type of a payload in the request, and the one or more processors are further configured to cause the first network entity to:

output or obtain the one or more messages based at least in part on a category of services that corresponds to the payload type, the category of services comprising the first network service, the second network entity selected based at least in part on the category of services.

15. The apparatus of claim 14, wherein the request further comprises a server address for the first network service, and the one or more processors are further configured to cause the first network entity to:

output, to the second network entity, an indication of the server address for the first network service.

16. The apparatus of claim 1, wherein the one or more processors are further configured to cause the first network entity to:

verify, based at least in part on the indicator of the first network service, that a subscription of the UE supports the first network service.

17. The apparatus of claim 1, wherein the request comprises a payload for a validation procedure.

18. An apparatus for wireless communication at a second network entity, comprising:

one or more memories; and one or more processors coupled with the one or more memories and configured to cause the second network entity to:

obtain, from a first network entity, a request to validate a user equipment (UE) for a first network service, the request comprising an indicator of the first network service of a plurality of network services; and output or obtain one or more messages with a third network entity, a fourth network entity, or both to validate the UE for the first network service based at least in part on the indicator of the first network service, wherein the one or more messages are output or obtained based at least in part on the indicator of the first network service and support, by the third network entity, the fourth network entity, or both, of validation for the first network service.

19. The apparatus of claim 18, wherein the one or more processors are further configured to cause the second network entity to:

output, to the third network entity, an indication that the second network entity supports the first network service; and obtain, from the third network entity, an indication of a target address of the fourth network entity that corresponds to the indicator of the first network service, wherein the one or more messages are output or obtained based at least in part on the indication of the target address of the fourth network entity.

20. The apparatus of claim 19, wherein the one or more processors are further configured to cause the second network entity to:

output, to the third network entity, an indication of a range of domain names that correspond to the first network service supported by the second network entity.

21. The apparatus of claim 19, wherein the one or more processors are further configured to cause the second network entity to:

output, to the third network entity, an indication of a category of services supported by the second network entity, the category of services comprising the first network service.

22. The apparatus of claim 18, wherein the indicator of the first network service comprises a service identifier, a service name, a server address, or a combination thereof.

23. An apparatus for wireless communication at a user equipment (UE), comprising:

one or more memories; and one or more processors coupled with the one or more memories and configured to cause the UE to:

output, to a first network entity, for a request to validate a first network service for the UE, the request comprising an indicator of the first network service of a plurality of network services; and output or obtain one or more messages with the first network entity to validate the UE for the first network service based at least in part on outputting the request.

24. The apparatus of claim 23, wherein the indicator of the first network service comprises a service-level device identifier, the service-level device identifier corresponding to a service identifier, a service name, or both of the first network service.

25. The apparatus of claim 23, wherein the indicator of the first network service comprises a payload type of a payload in the request, wherein the payload type corresponds to a service name of the first network service.

26. The apparatus of claim 23, wherein the indicator of the first network service comprises a server address.

27. The apparatus of claim 23, wherein the indicator of the first network service comprises a payload type of a payload in the request, wherein the payload type corresponds to a category of services comprising the first network service, and the request further comprises a server address for the first network service.

28. A method for wireless communication at a first network entity, comprising:

obtaining a request to validate a first network service for a user equipment (UE), the request comprising an indicator of the first network service of a plurality of network services; and outputting or obtaining one or more messages with a second network entity to validate the UE for the first network service based at least in part on the indicator of the first network service, the second network entity selected based at least in part on the indicator of the first network service and the second network entity supporting validation for the first network service.

29. The method of claim 28, further comprising:

outputting or obtaining, based at least in part on the indicator of the first network service, a query message with a third network entity to discover the second network entity supporting validation for the first network service.

30. The method of claim 28, wherein the indicator of the first network service comprises a service-level device identifier, the outputting or obtaining the one or more messages further comprising:

outputting or obtaining the one or more messages based at least in part on a service identifier corresponding to the service-level device identifier, the second network entity selected based at least in part on the service identifier.

31. A method for wireless communication at a second network entity, comprising:

obtaining, from a first network entity, a request to validate a user equipment (UE) for a first network service, the request comprising an indicator of the first network service of a plurality of network services; and outputting or obtaining one or more messages with a third network entity, a fourth network entity, or both to validate the UE for the first network service based at least in part on the indicator of the first network service, wherein the one or more messages are output or obtained based at least in part on the indicator of the first network service and the third network entity, the fourth network entity, or both supporting validation for the first network service.

32. The method of claim 31, further comprising:

outputting, to the third network entity, an indication that the second network entity supports the first network service; and obtaining, from the third network entity, an indication of a target address of the fourth network entity corresponding to the indicator of the first network service, wherein the one or more messages are output or obtained based at least in part on obtaining the indication of the target address of the fourth network entity.

33. The method of claim 31, further comprising:

outputting, to the third network entity, an indication of a range of domain names corresponding to the first network service supported by the second network entity.

34. A method for wireless communication at a user equipment (UE), comprising:

outputting, to a first network entity, for a request to validate a first network service for the UE, the request comprising an indicator of the first network service of a plurality of network services; and outputting or obtaining one or more messages with the first network entity to validate the UE for the first network service based at least in part on outputting the request.

35. The method of claim 34, wherein the indicator of the first network service comprises a service-level device identifier, the service-level device identifier corresponding to a service identifier or a service name of the first network service.

36. The method of claim 34, wherein the indicator of the first network service comprises a payload type of a payload in the request, the payload type corresponding to a service name of the first network service.

* * * * *